United States Patent [19]

Simpson et al.

[11] Patent Number: 5,005,323
[45] Date of Patent: Apr. 9, 1991

[54] APPARATUS FOR SECURING A ROOFING SUPPORT SPACER TO UNDERLYING SUPPORT STRUCTURES

[75] Inventors: Harold G. Simpson, Mustang; Charanjit S. Bindra, Edmond, both of Okla.

[73] Assignee: Harold Simpson, Inc., Oklahoma City, Okla.

[21] Appl. No.: 353,694

[22] Filed: May 17, 1989

Related U.S. Application Data

[63] Continuation of Ser. No. 90,689, Aug. 28, 1987, abandoned, which is a continuation-in-part of Ser. No. 378,241, May 14, 1982, Pat. No. 4,528,789, Ser. No. 428,568, Sep. 30, 1982, Pat. No. 4,602,468, Ser. No. 481,844, Apr. 13, 1983, Pat. No. 4,700,522, Ser. No. 481,858, Apr. 4, 1983, Pat. No. 4,525,976, Ser. No. 503,299, Jun. 10, 1983, Pat. No. 4,534,148, Ser. No. 568,083, Jan. 4, 1984, Pat. No. 4,597,234, Ser. No. 698,082, Feb. 4, 1985, abandoned, Ser. No. 713,319, Mar. 18, 1985, Pat. No. 4,620,397, and Ser. No. 745,320, Jun. 14, 1985, abandoned.

[51] Int. Cl.$^5$ .................................................. E04B 7/02
[52] U.S. Cl. .......................................... 52/90; 52/410; 52/478; 52/698; 52/440
[58] Field of Search ................. 52/508, 703, 713, 698, 52/410, 481, 478, 90

[56] References Cited

U.S. PATENT DOCUMENTS

| | | | |
|---|---|---|---|
| 3,407,548 | 10/1968 | Russell | 52/58 |
| 4,106,256 | 8/1978 | Cody | 52/646 |
| 4,213,282 | 7/1980 | Heckelsberg | 52/404 |
| 4,226,058 | 10/1980 | Riley | 52/478 X |
| 4,314,428 | 2/1982 | Bromwell | 52/22 |
| 4,608,791 | 9/1986 | McClure | 52/90 |
| 4,691,491 | 9/1987 | Lilley | 52/508 X |

FOREIGN PATENT DOCUMENTS

1239744 7/1960 France .
2330824 7/1977 France .

*Primary Examiner*—David A. Scherbel
*Assistant Examiner*—Linda J. Watson
*Attorney, Agent, or Firm*—Bill D. McCarthy; Glen M. Burdick

[57] ABSTRACT

An apparatus for securing adjustable roofing support spacers to underlying secondary structural supports, the adjustable roofing support spacers used to support a new sloped roof system over a preexisting roof deck. The apparatus comprises a bearing member which is positioned on top of the existing roof deck, and connectors which connect the bearing member and the support spacer to the structural support and extensive through the roof deck.

2 Claims, 14 Drawing Sheets

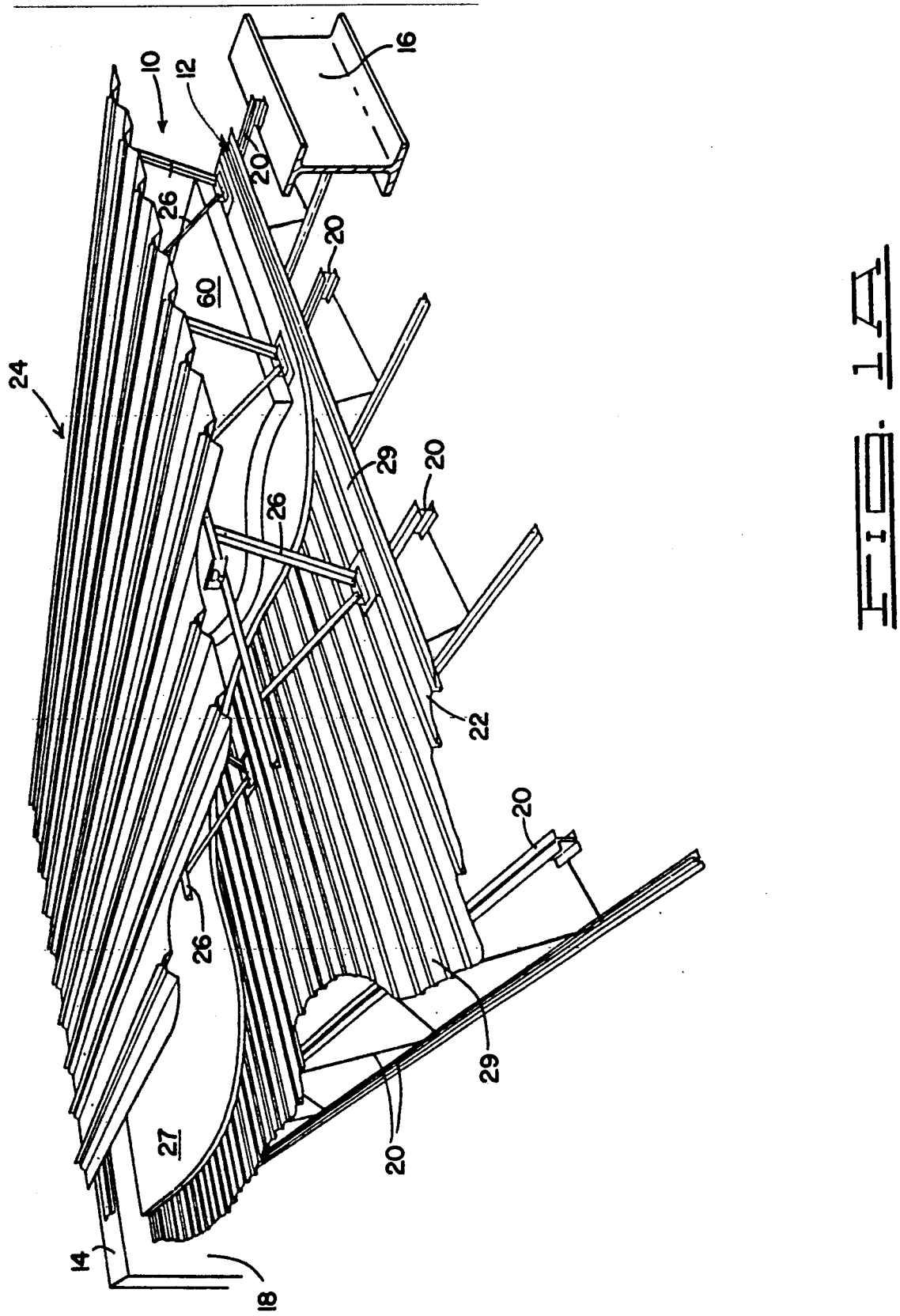

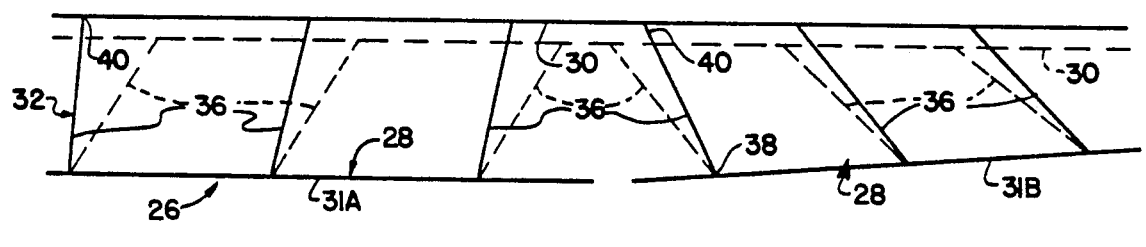
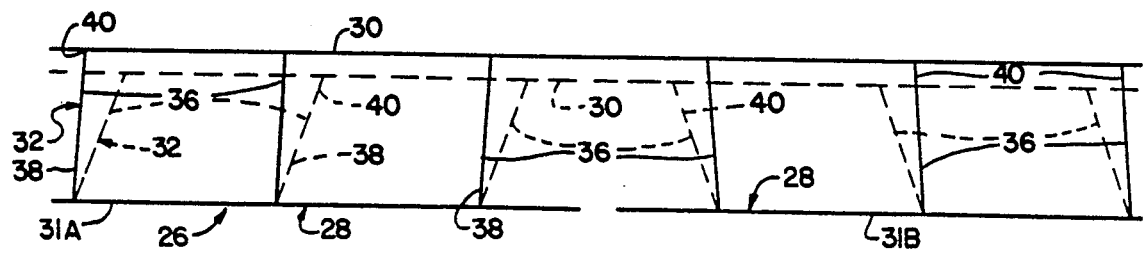

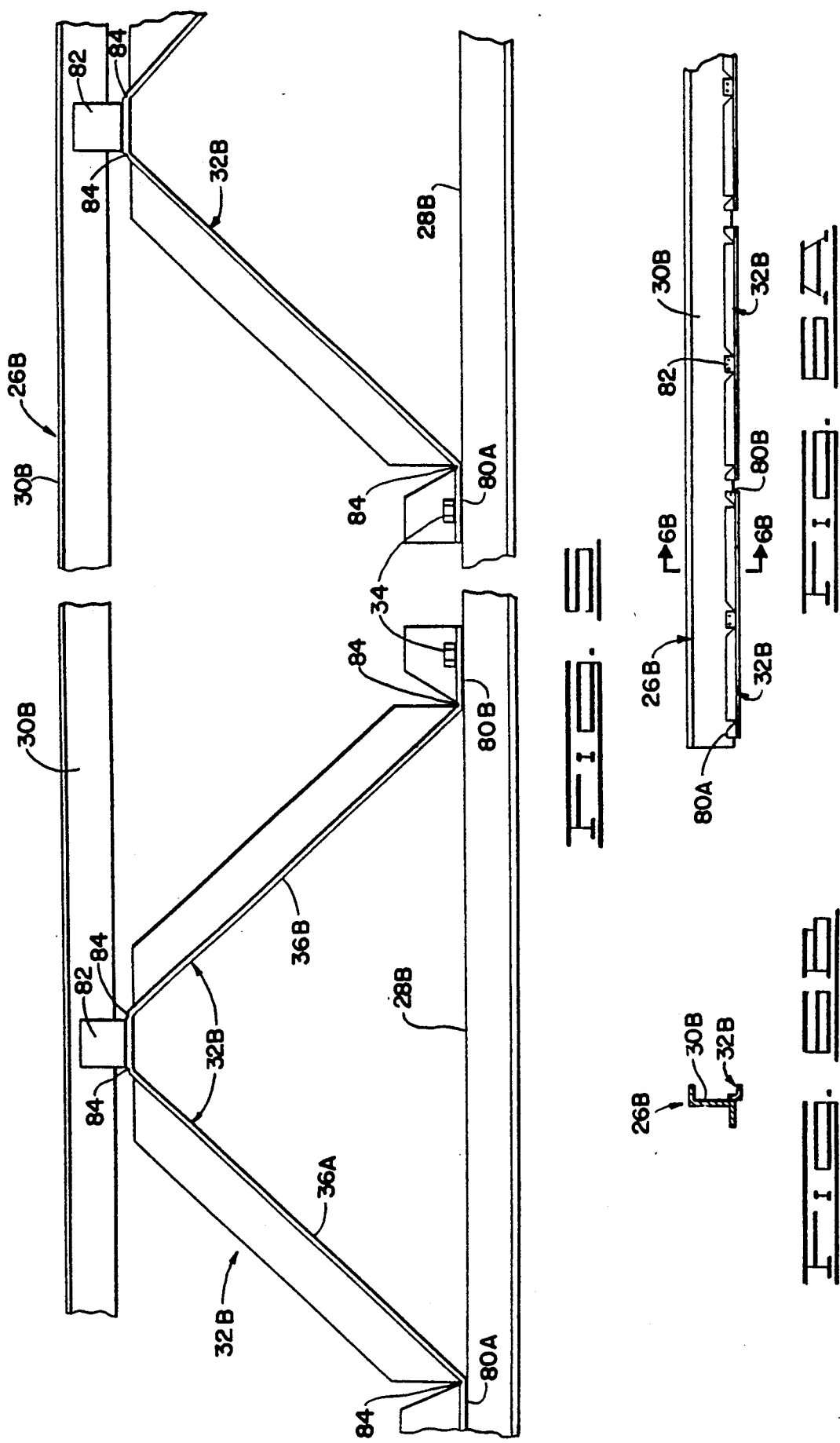

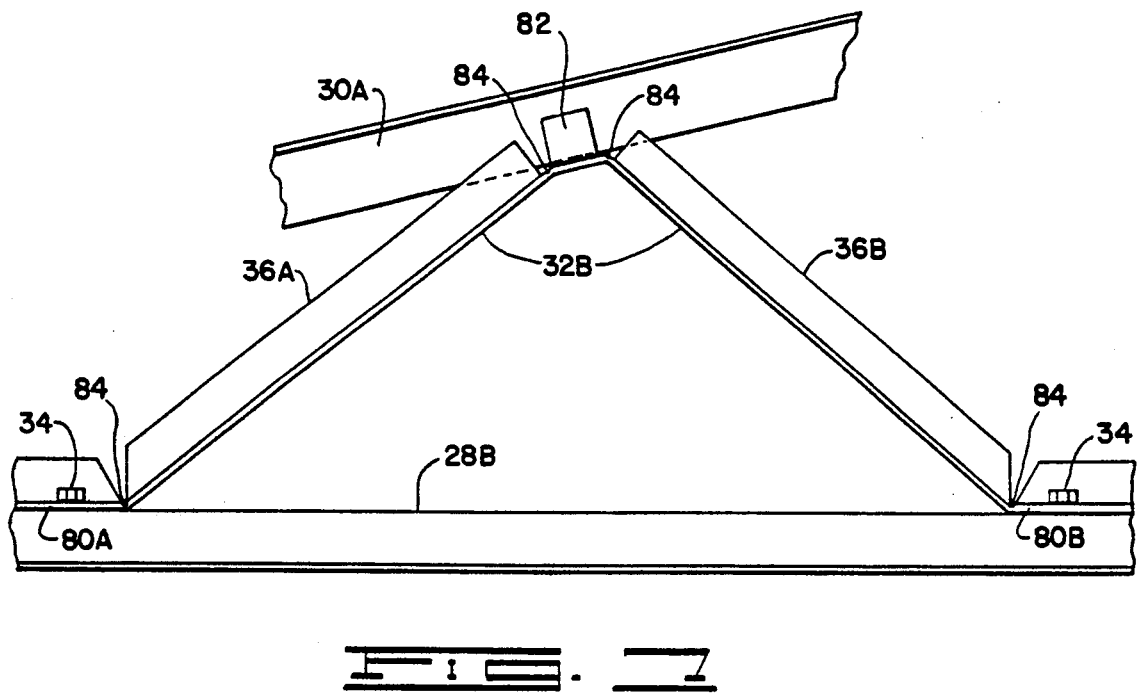
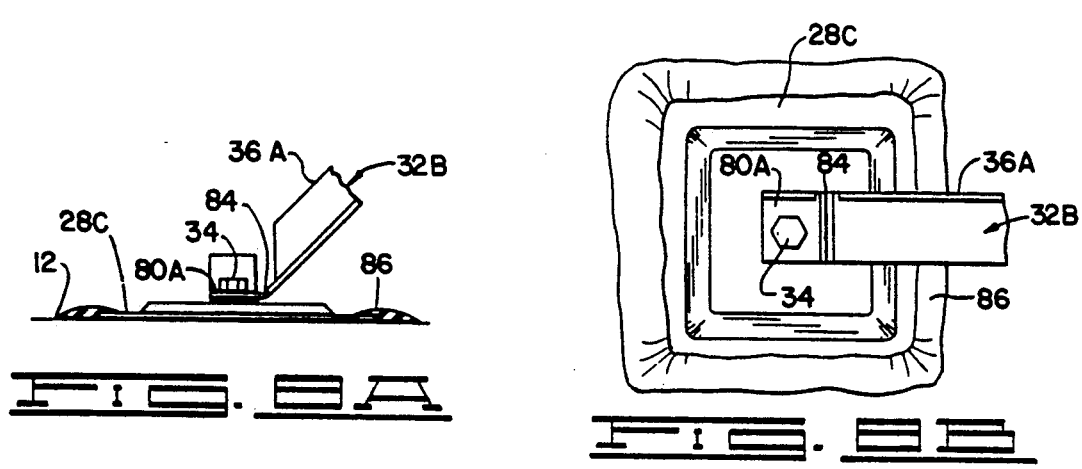

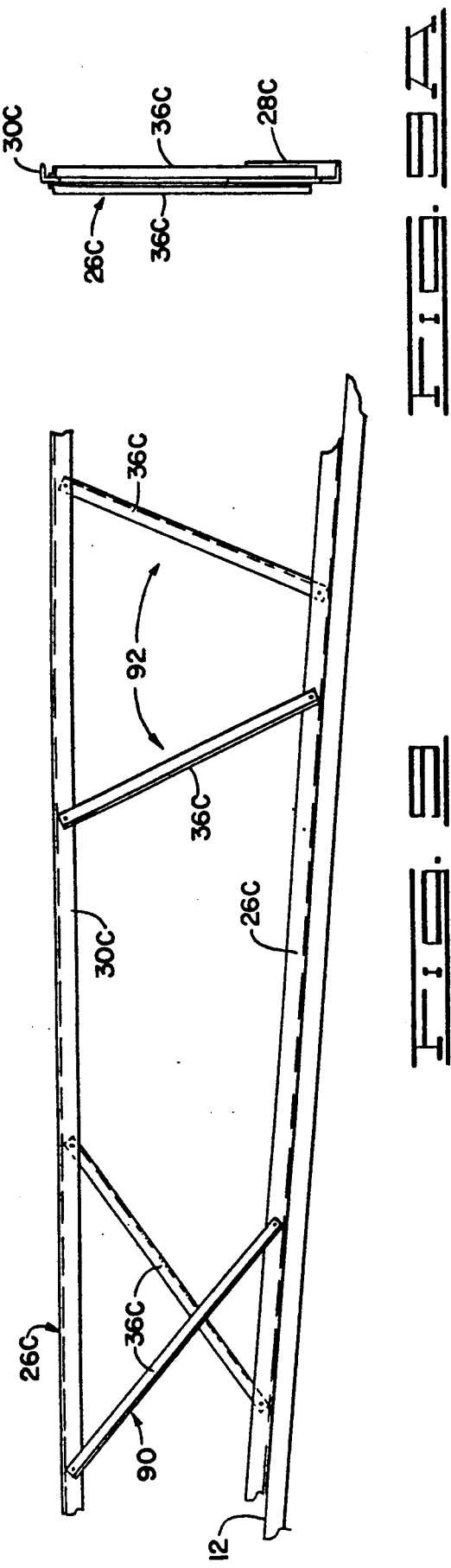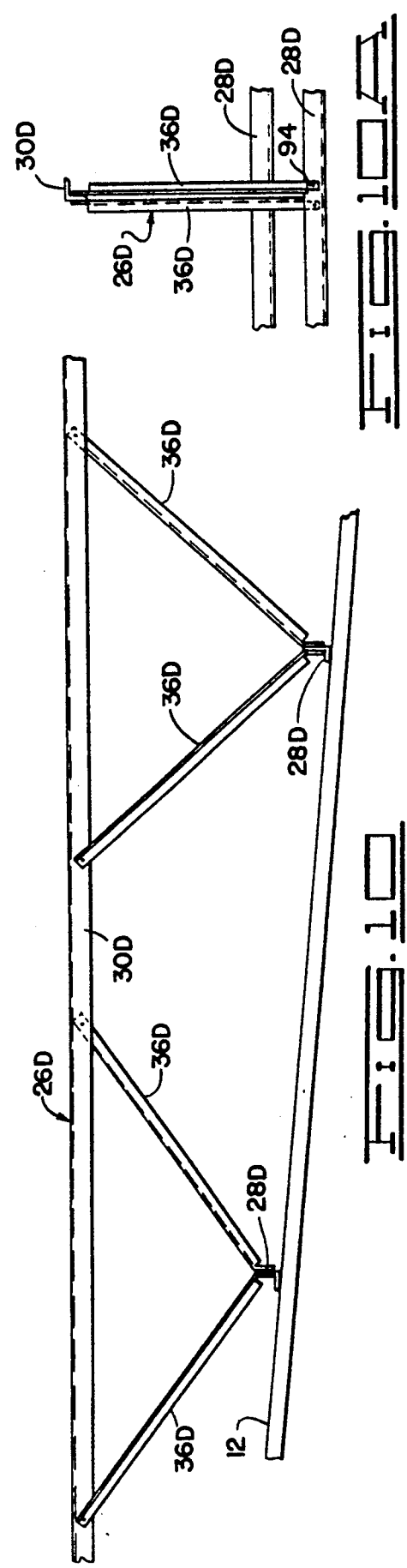

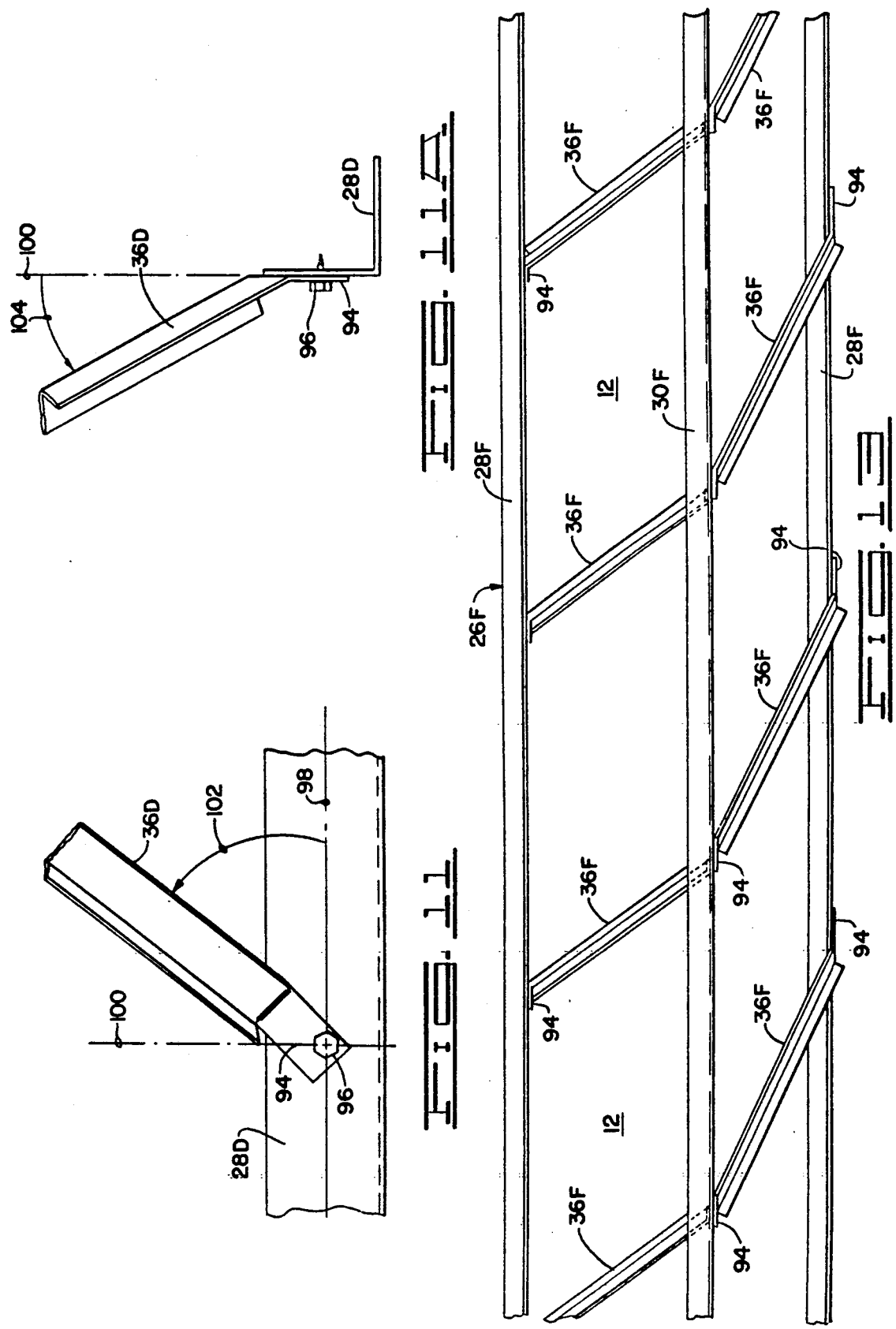

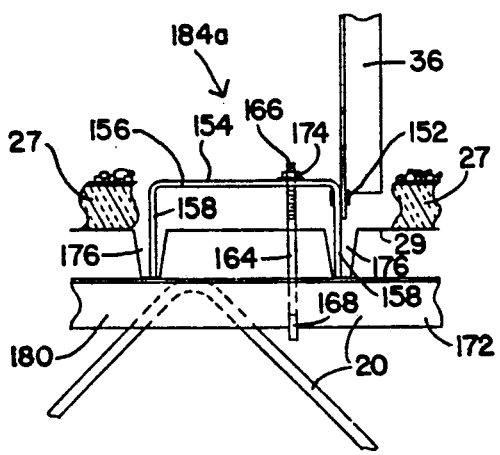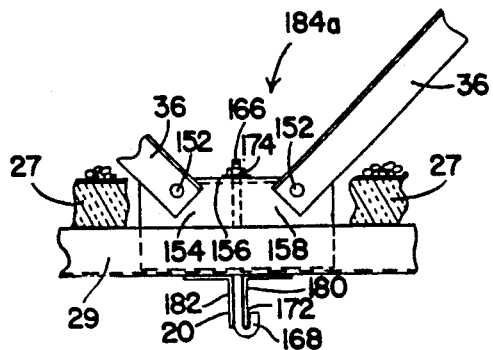
 
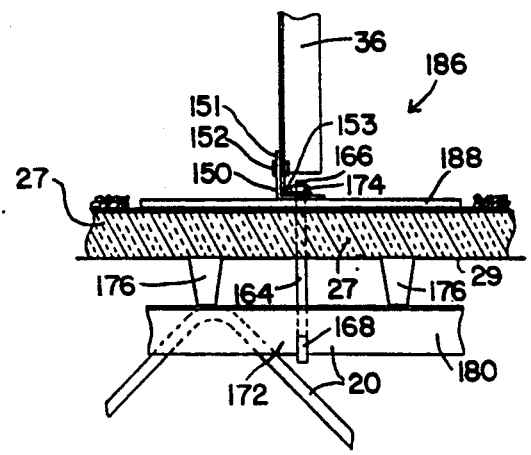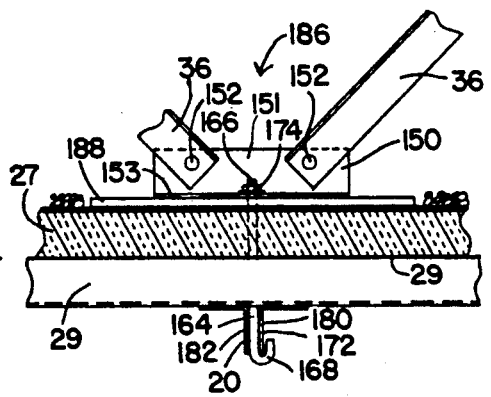
 
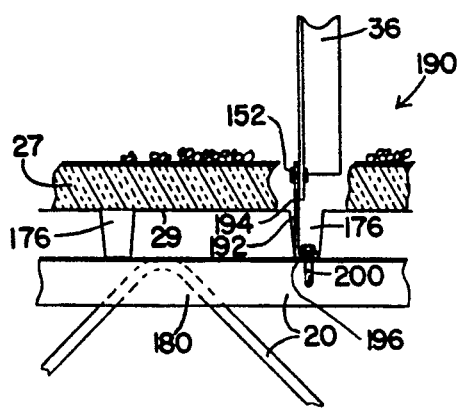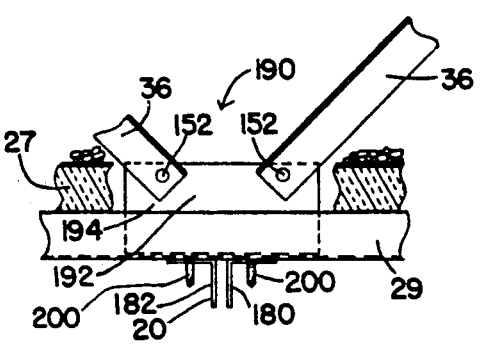
 

APPARATUS FOR SECURING A ROOFING SUPPORT SPACER TO UNDERLYING SUPPORT STRUCTURES

This is a continuation of application Ser. No. 090,689 filed Aug. 28, 1987 now abandoned which is a continuation-in-part of the following U.S. patent applications, and incorporates by reference each of the applications:

INSULATED ROOF SYSTEM, Ser. No. 378,241 filed May 14, 1982, now U.S. Pat. No. 4,528,789 issued July 16, 1985.

ROOF CLIP ASSEMBLY FOR A ROOF SYSTEM, Ser. No. 428,568 filed Sept. 30, 1982, now U.S. Pat. No. 4,602,468 issued July 29, 1986.

IMPROVED STANDING SEAM SIDELAP SYSTEM AND METHOD FOR ASSEMBLING SAME, Ser. No. 481,844 filed Apr. 13, 1983, now U.S. Pat. No. 4,700,522 issued Oct. 20, 1987 following 1983.

METHOD AND APPARATUS FOR ASSEMBLING STANDING SEAM ROOFS, Ser. No. 481,858 field Apr. 4, 1983, now U.S. Pat. No. 4,525,976 issued July 2, 1985.

ADJUSTABLE ROOFING SUPPORT SPACER APPARATUS AND ERECTION METHOD, Ser. No. 503,299 filed June 10, 1983, now U.S. Pat. No. 4,534,148 issued Aug. 13, 1985.

STANDING SEAM ROOF ASSEMBLY, Ser. No. 568,083 filed Jan. 4, 1984, now U.S. Pat. No. 4,597,234 issued July 1, 1986.

APPARATUS FOR ASSEMBLING STANDING SEAM ROOFS, Ser. No. 698,082 filed Feb. 4, 1985, and abandoned May 14, 1986.

ROOF SYSTEM POSITIONABLE OVER AN EXISTING ROOF STRUCTURE AND METHOD FOR INSTALLING SAME, Ser. No. 713,319 filed Mar. 18, 1985, now U.S. Pat. No. 4,620,397 issued Nov. 4, 1986.

STANDING SEAM ROOF ASSEMBLY AND SUPPORT APPARATUS, Ser. No. 745,320 filed June 14, 1985.

BACKGROUND OF THE INVENTION

1. Field of the Invention

The present invention relates to building roof assemblies for building structures, and more particularly, but not by way of limitation, to apparatus for securing adjustable roofing support spacers to preexisting roof structures.

2. Discussion of Prior Art

Numerous types of roof assemblies have heretofore been proposed for pre-engineered buildings in efforts to provide a watertight roof assembly, while at the same time enabling the roof assembly to expand and contract as changes in temperature are encountered. Typical of such prior art roof assemblies which has met with considerable success in recent years is the standing seam roof assembly. The panel members of the standing seam roof assembly are joined to each other along adjacent sides such that the sides are lapped together to form the standing seams. The panel members of the standing seam roof are secured to the secondary structural members by means of clips. The interconnection of the panel members of the standing seam roof lend stiffness and strength to the roof structure while allowing the roof structure to expand and contract as a function of the coefficient of expansion of the materials of which the roof panels are made and the temperature cycles to which the roof panels are exposed.

In addition to the use of standing seam roof assemblies in new construction, standing seam roof assemblies are also finding increasing usage in another segment of the roofing industry, that of "built-up roof" replacement. Generally, a built-up roof is formed of a plurality of sections which are interconnected and overcoated with asphaltic composition to provide a watertight seal. While such roof assemblies have generally served successfully, problems have nevertheless been encountered as a built-up roofs age, or when buildings settle, or when construction errors result in water holding roof pockets. Standing water in such pockets often results in deterioration of roofs.

A need has long been recognized for a means for replacing built-up roofs, as well as other conventional roofs, which does not require substantial modification to the preexisting roofs and which is economical both in fabrication and on-site construction. Further, it is highly desirable that the replacement roof assembly be capable of providing a new roof surface independent to the variations in the surface of the underlying roof. Past repair methods, especially those capable of altering the slope of the roof surface to improve drainage characteristics, have required substantial destruction of the original roof assembly and extensive custom construction, exposing the building interior to weather damage and being excessively time consuming and expensive.

U.S. Pat. Nos. 4,534,148, 4,520,610 and 4,620,397 presented adjustable roofing support spacers for supporting replacement roof panels at a desired new slope over a preexisting roof. The present invention presents improvements to this same art as it presents apparatus for securing the adjustable roofing support spacers to the preexisting roof and building structure.

SUMMARY OF THE INVENTION

The present invention provides for securing a roofing support spacer for use over a preexisting roof structure to support plural roof panels forming a new roof structure. The roofing support spacer, broadly speaking, comprises a lower member spatially disposable above the preexisting roof; one or more web assemblies connected to the lower member; and an upper member, the upper member receiving the plural roof panels thereon and secured thereto.

An object of the present invention is to provide an apparatus for securing the transfer of inwardly directed, outwardly direct and shear loads from the roofing support spacer to a preexisting roof structure in such a manner that the preexisting roof or deck is not damaged by the applied loads and which does not require substantial modification of or damage to the preexisting roof.

Another object of the present invention, while accomplishing the above stated object, is to provide alternate ways of securing the adjustable roofing support spacer to an underlying secondary structural support.

Another object to the present invention, while achieving the above stated objects, is to provide an apparatus for securing the adjustable roofing support spacer when the support spacer is disposed at right angles to the underlying secondary structural support. The underlying secondary structural support may be roof purlins, joists or other members.

Other objects, features and advantages of the present invention will become clear from a reading of the following detailed description when read in conjunction with the appended claims.

BRIEF DESCRIPTION OF THE DRAWINGS

FIGS. 1A and 1B are partial perspective views of a roof system featuring the present invention.

FIGS. 2A and 2B are schematic depictions of adjustable roofing support spacers utilized in the roof system of FIG. 1.

FIG. 5 is a partial, side elevational of another adjustable support spacer. FIG. 6A is a side elevational view of the support spacer of FIG. 5 in a folded mode prior to shipping, and FIG. 6B is taken at 6B—6B in FIG. 6A.

FIG. 7 is a partial side elevational view of an adjustable web assembly utilized in the support spacer of FIG. 5.

FIG. 8A is a side elevational view of a base plate utilized in lieu of a base support member of the support spacer such as shown in FIG. 5. FIG. 8B is a top plan view thereof.

FIGS. 9 and 10 show side elevational views of alternate support spacer members. FIGS. 9A and 10A show end elevational views, respectively, of the support spacer members of a FIGS. 9 and 10.

FIG. 11 and 11A are side and elevational views, respectively, of a double direction hinge connection.

FIG. 13 is a plan view of one more alternate support spacer.

FIGS. 16A and 16B are end and side elevational views, respectively, of the clip members utilized in support assembly of FIG. 15.

FIGS. 18A and 18B are end and side views of the "C"shaped support channel used to replace the adjustable support spacer lower member and secured to an existing joist.

FIGS. 19A and 19B are end and side views of the adjustable support spacer lower member mounted on top of a spreader plated and secured to an existing joist.

FIGS. 20A and 20B are end and side views of the adjustable support spacer lower member trimmed for receipt in a corrugation of the existing roof deck and secured to an existing joist.

DESCRIPTION

Figure 1B:
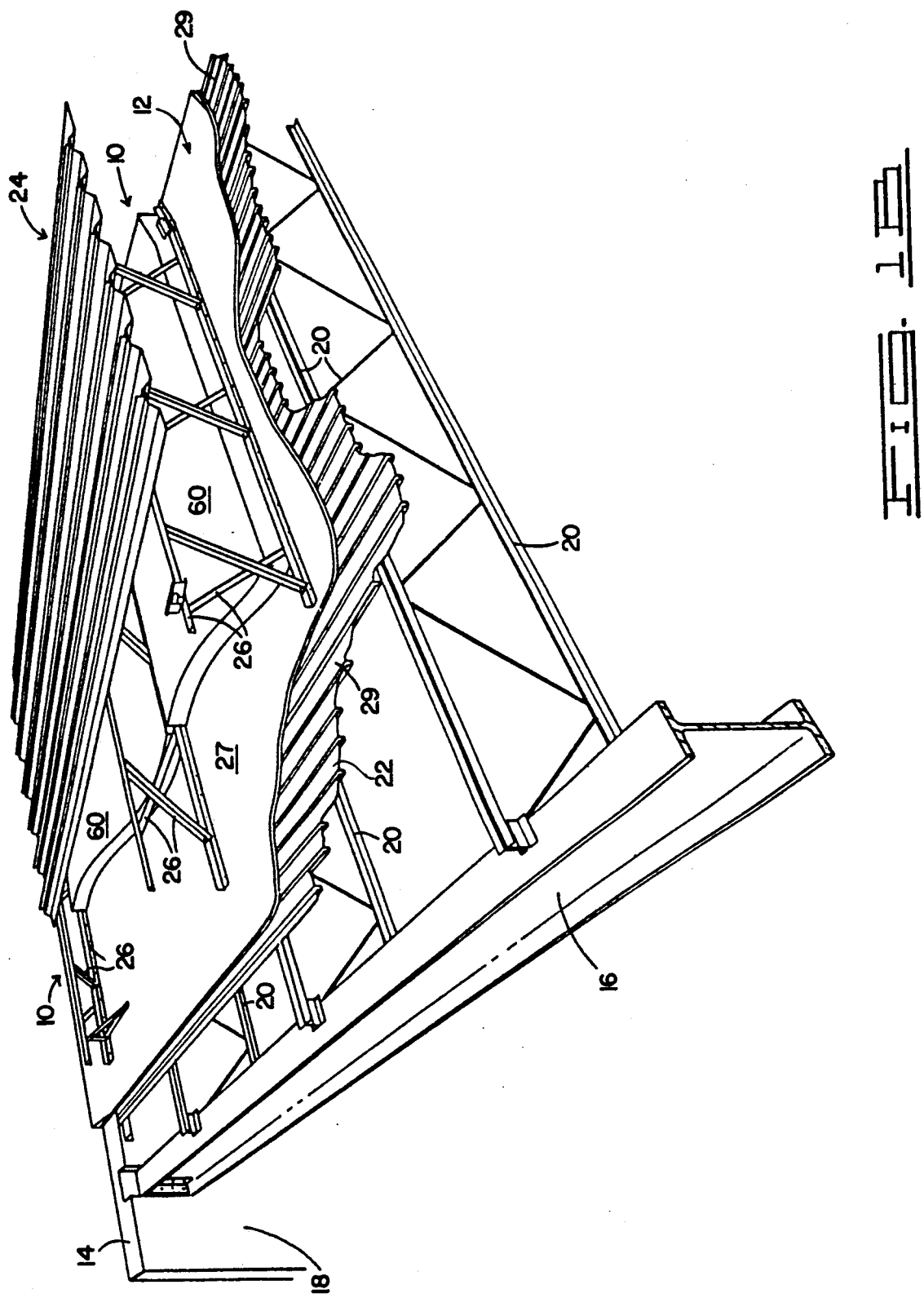

Concerning design criteria for roofs, the relative importance and nature of many factors —such as strength, watertightness, costs, durability and aesthetics —vary depending on the roof slope, geographic area in which the roof is to be used, occupancy of the building to be covered, length of panel run without expansion or contraction joints, extent and nature of inwardly and outwardly directed loads and shear loads, spans on which the roof is to be used, insulation, vapor control requirements and other factors relating to the simplicity and ease of its manufacture, transportation and erection.

Standing seam metal panel roof systems of the functional type are usually placed on relatively flat building slopes and as a result must be capable of resisting a standing head of water when used with buildings housing most occupanies. Because the roof is relatively flat, panel runs are often long, and because expansion and contraction joints are difficult to make watertight, as few as possible. This means panel attachment to the underlying secondary structural system must accommodate panel expansion and contraction. Steeper roof pitches, as are used with architectural panels, are shorter and require less end lap, side lap and fastener watertightness because gravity pulls the water down away from the panel joints faster than the wind blows it through panel joints and in general snow and ice slide off the roof.

To obtain watertightness at points of attachment of the roof panels to underlying structure, the panel must be permitted to expand and contract without fracturing the panel or failing its support system. This may be accomplished by limiting the length of the panel or by utilizing a support structural that is sufficiently flexible to allow the attachment means to move with the expanding or contracting panel. The flexibility of the support structural must be greater for longer panel runs since the expansion or contraction of the panel will be greater.

Panel attachment is further complicated by the fact that most buildings are insulated. Many past solutions have placed insulation material between the support structure and the panel. This enables ease of placement of the insulation material and has other advantages, but it complicates panel support and attachment. Most insulation materials contain small pockets of entrapped gas to gain advantageous insulating properties. The smaller and the more numerous the gas pockets the better the insulation rating tends to be. When the insulation material is crushed, the gas pockets are destroyed and much of the insulating value is lost. As a result, low cost insulation materials are structurally weak and are easily compressed and damaged by imposed roof load.

Sometimes the thermal protection lost by prior art crushing of insulation material has been compensated for by substituting a more expensive but somewhat structurally more adequate insulation material. With the use of adjustable roofing support spacers, attached via the apparatus of the present invention, the insulation can be laid directly over the old roof without damage occurring by the installed spacers.

Referring now to the drawings, and more particularly to FIGS. 1A and 1B, shown therein is a portion of a new roof system 10 supported by a preexisting roof 12 of a building structure 14. The new roof system 10 can be adapted to function with the preexisting roof 12 of the building structure 14. The preexisting roof 12 can be any preexisting roof structure, such as a built-up roof, which is connected to and supported by conventional elements, such as a primary and secondary structural systems. The primary structural systems of the building structure 14 will usually consist of a plurality of upwardly extending column members (not shown) which are rigidly connected to a foundation and a plurality of primary beams 16 which are generally horizontally disposed and supported by the column members and wall members 18 (one shown). The secondary structural system will usually consist of a number of purlins or joists 20 supported by the primary beams 16 or other members, the joists 20 supporting the preexisting roof 12 which has a substantially planar upper surface 22.

The roof system 10 will generally be formed of a plurality of metal roof panels, such as panels 24. However, any type of roof may be used with the adjustable roofing support spacers, and furthermore, the connections used to attach the adjustable roofing support spacer to the existing structure may be used to attach a wide variety of non-adjustable roofing support spacers to an existing structure. The roof panels 24 of the roof system 10 are connected to provide a roof plane for the roof system 10, and while generally flat panels (except for joints and stiffener ribs) are depicted in FIGS. 1A and 1B, it will be understood that the present invention is also applicable to curvilinearly shaped panels such as is sometimes preferred by certain architectural planners. Further, if desired, the roof sections of the roof system 10 can be disposed on the preexisting roof 12 such that interlocking adjacent roof sections form a multi-pitched roof. On the other hand, the roof sections can be joined such that the roof system 10 is provided with a substantially single roof plane, i.e. a roof plane having a unidirectional slope, as depicted in FIGS. 1A and 1B.

The roof panels 24 of the roof system 10 are supported by a plurality of one form of an adjustable roofing support spacer 26, these spacers being disposed along an existing built-up roof 27 or existing deck 29 of the preexisting roof 12 of the building structure 14 so that each of the adjustable roofing support spacers 26 extends upwardly from the preexisting roof 12 as required to support the roof panels 24 in a predetermined planar slope. In FIG. 1A the adjustable roofing support spacers 26 run parallel to the old existing deck 29 and at right angles to the underlying joists 20. The bottom of the support spacers 26 may rest on the existing built-up roof 27, the existing deck 29 or directly on the underlying joists 20. In FIG. 1B the adjustable roofing support spacers 26 run at right angles to the old existing deck 29 and parallel to the underlying joists 20.

FIGS. 2A through 14

Referring now to FIGS. 2A and 2B, each of the adjustable roofing support spacers 26 is characterized as having one or more base support members 28, a spatially disposed upper beam 30 and an adjustable web assembly 32 interconnecting the base support members 28 and the upper beam 30. The base support members 28 may be formed as a continuous segment or a plurality of segments as shown in the drawings. When the base support members 28 are formed of a plurality of segments, such as segments 31A and 31B, the base support members 28 are adapted to more readily fit the contour of the preexisting roof 12. The base support members 28 provide for load distribution across the area of the base support members 28 onto the preexisting roof 12 in contrast to the concentrated load point that would be present at the lower end of the web assembly 32, were the base support members 28 not there to distribute the load. The web assembly 32 of each of the adjustable roofing support spacers 26 is connected to the upper beam 30 and the base support members 28 at various positions so that the upper beam 30 of each of the adjustable roofing support spacers 26 is disposed a selected height above the base support members 28 (and thus above the upper surface 22 of the preexisting roof 12) independent of slope or irregularities that may be present in the preexisting roof 12.

As will become clear from the discussion which follows, two general classes of the new roof system 10 will be noted by viewing the adjustable roofing support spacers 26 shown in FIGS. 1A, 1B, 9, 10, 12 and 12A in plan. These are: (1) the directions of the base support member 28 and the upper beam 30 are the same (that is, substantially parallel); and (2) the directions of the base support member 28 and upper beam 30 are substantially perpendicular to each other. Each of these classes are again composed of two subclasses. These subclasses are: (1) the base support members 28 are substantially continuous (in which case, the web assemblies 32 are normally factory attached to the upper beams 30); and (2) the base support members are segmented and of intermediate lengths (in which case, the web assemblies 32 are normally factory attached to the intermediate pieces of the base support.)

In FIG. 2A the line drawing illustrates the adjustable feature of the adjustable roofing support spacer 26 where the upper beam 30 is in a substantially non-parallel relationship withat least one of the base support members 28 at a selected height. The phantom line drawing in FIG. 2A illustrates the adjustable roofing support spacer 26 wherein the upper beam is secured in a substantially non-parallel relationship with at least one of the base support members 28 at a second selected height. In FIG. 2B the line drawing illustrates the adjustable feature of the adjustable roofing support spacer 26 when the upper beam 30 is substantially horizontally disposed in a parallel relationship with the base support members 28 at a first selected height; the phantom line drawing in FIG. 2B illustrates the adjustable roofing support spacer 26 wherein the upper beam 30 is secured in a substantially parallel relationship with the base support members 28 at a second selected height. It is to be understood that the distance between the base support members 28 and the upper beam 30 of the adjustable roofing support spacer 26 can be varied between the geometrical limits of the angular disposition of the adjustable web assembly 32.

Figure 3:
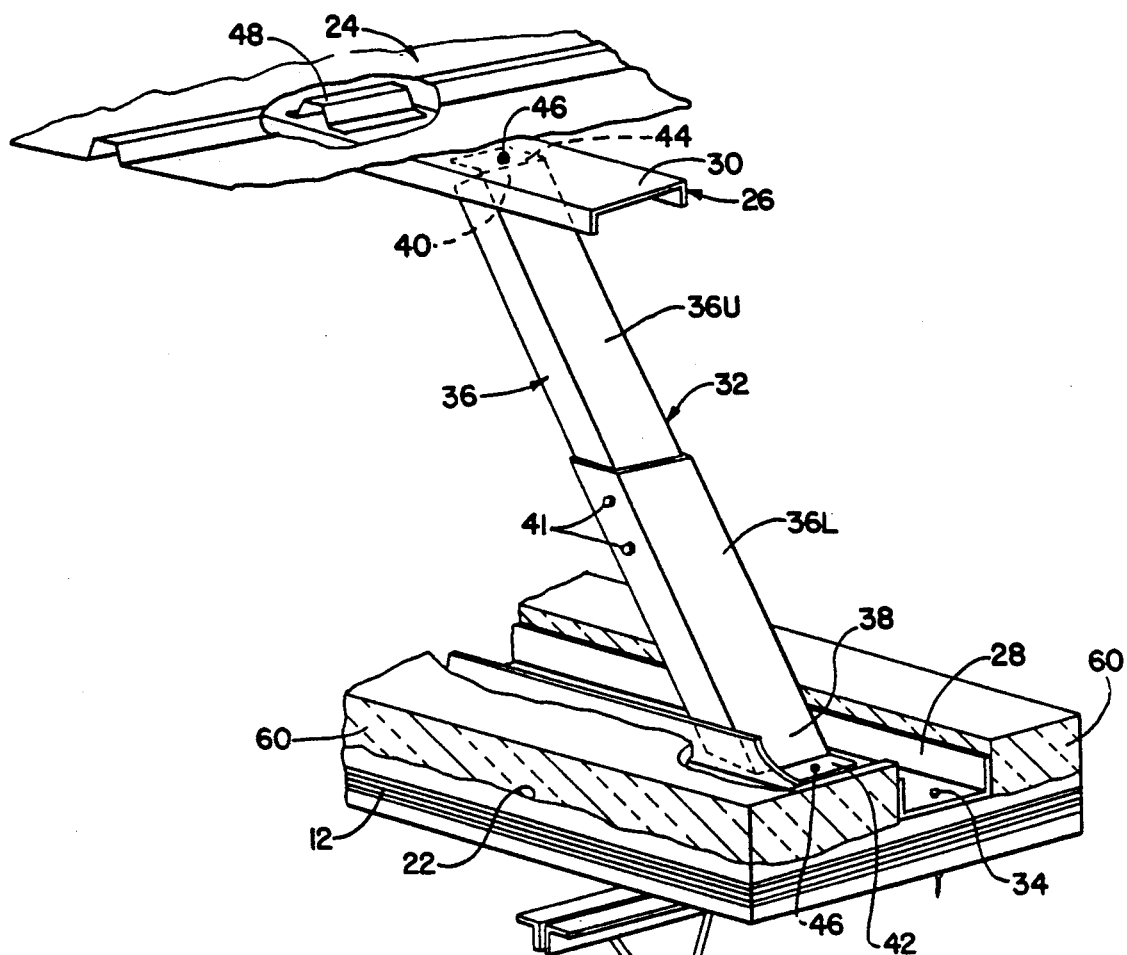
FIG. 3 is an isometric view of a spacer web utilized in the adjustable roofing support spacer of FIGS. 2A and 2B.
Figure 4:
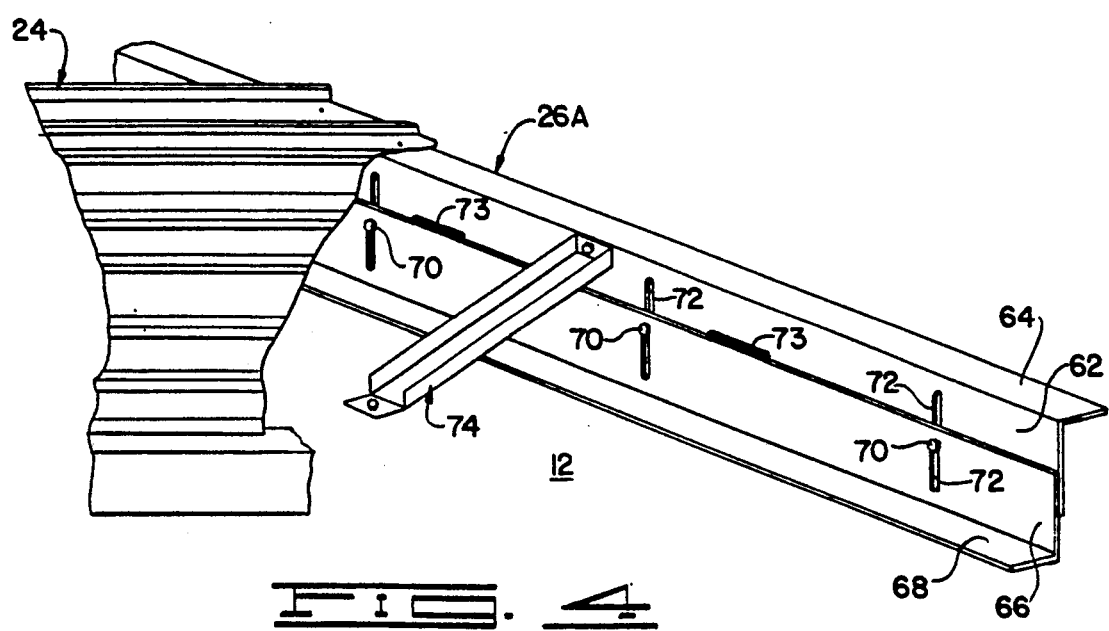
FIG. 4 is another adjustable roofing support spacer utilized in roof system of FIG. 1.

A feature of the adjustable roofing support spacer 26 is that the height of the upper beam 30 thereof can be adjusted by three ways, namely, (1) the angular adjustability of the web assembly 26; (2) overlapping and sliding within the web assembly 26 itself as depicted in the embodiments of FIGS. 3 and 4; and (3) varying the connection point (that is, placement of the flange members 82) of the web assembly 32 to the upper beam 30.

This latter adjustment is not available in the embodiment depicted in FIG. 7.

The base support members 28 of the adjustable roofing support spacers 26 that support the roof panels 24 are secured to the preexisting roof 12 by any suitable fasteners known in the art, such as a plurality of self-drilling, self-tapping screws 34, or to the secondary structure members.

The web assembly 32 of the adjustable roofing support spacer 26 depicted in FIGS. 2A and 2B comprises a plurality of spacer webs 36 having a first end portion 38 and an opposed second end portion 40. the first end 38 of each of the spacer webs 36 is secured to one of the base support members 28 of the adjustable roofing support spacers 26 and the opposed second end 40 of the spacer webs 36 is secured to the upper beam 30. The angular disposition of the spacer webs 36 of the web assembly 32 of the adjustable roofing support spacers 26 is such that the upper beam 30 is maintained in a proper, selected relationship with the base support members 28 and thus the preexisting roof 12 of the building structure 14. The upper beam 30 of each of the adjustable roofing support spacers 26 in adjacent roof panels 24 may be secured via their adjacently disposed ends by any suitable means known in the art.

The roof panel members 24 are positioned upon and supported by the upper beam 30 of the spacer webs 36 so as to substantially extend across and form a continuous panel section across the upper beams 30. The roof panel members 24 are secured to the upper beams 30 of the adjustable roofing support spacers 26 in such a manner that the roof system 10 is provided with a selected planar slope substantially independent to the planar slope of the preexisting roof 12. Any suitable panel fastener assemblies can be employed for connecting the roof panel members 24 to the upper beam 30 of the adjustable roofing support spacers 26, such as self-drilling, self-tapping screws heretofore known in the art and employed in the assembly of roof panels in standing seam and standard corrugated roof assemblies and the like, or some of the more advantageous means shown hereinafter.

The roof system 10 employs the adjustable roofing support spacers 26 which are capable of being selectively adjusted to provide a desired surface slope for the roof panel members 24 independent of the surface slope or shape of the preexisting roof 12 on which the roof system 10 is secured. The shape of the preexisting roof can be sawtooth, parabolas etc.

Referring now to FIG. 3, the connection of the spacer webs 36 of the web assembly 32 to the base support members 28 and the upper beam 30 of the adjustable roofing support spacers 26 of the roof system 10 is shown in detail. While the web assembly 32 comprises a plurality of spacer webs 36, only one spacer web 26 is illustrated in FIG. 3. In FIG. 3, spacer web 36 is shown as a telescoping member having an upper spacer web section 36U, a lower spacer web section 36L and screw fasteners 41 which secure the upper and lower web sections once the spacer web 36 is adjusted to the desired angle and length. While the telescoping member 36 is shown as overlapping channel sections, other open sections such as flat plates, angles, zees and similar open and closed sections, such as circular, rectangular, square or triangular tube or pipe sections can also be used. Of course, the spacer webs 36 can be constructed of a single channel member as otherwise shown in the drawing. The screw fasteners 41 can be self-drilling, self-tapping screws, or a series of holes can be provided in the upper spacer web section 36U and the height adjusted by appropriating registering the selected holes with the screw fasteners 41.

It should be noted that the length and angular disposition of the spacer webs 36 may be different for each adjustable roofing support spacer 26, and that the angular disposition of the spacer webs will be dependent upon the selected height of the upper beam 30 of the adjustable roofing support spacer 26, the relationship of the upper beam 30 to the base support members 28, and the plane of the preexisting roof 12.

The upper beam 30 and the base support members 28 of the adjustable roofing support spacer 26 are illustrated as channel members, the channel portion of the base support members 28 adapted to receive the opposed first end portion 38 of the spacer web 36. The spacer web 36, also a channel member, further comprises a flange member 42 formed on the first end portion 38 thereof, and a flange member 44 formed on the opposed second end portion 40 thereof. The first end portion 38 of the spacer web 36 is secured to one of the base support members 28 of the adjustable roofing support spacer 26 via the flange member 42 and self-tapping, self-drilling screw 46. The opposed second end portion 40 of the spacer web 36 is secured to the upper beam 30 of the adjustable roofing support spacer 26 via the flange member 44 using another self-tapping, self-drilling screw 46 or other suitable fastening means such as welding. The opposed second end portion 40 of the spacer web 36 can be skewed up to about fifteen degrees so that, in the assembled position of the web assembly 32, the surface of the upper beam 30 used to support the corrugation support clip 48 can be maintained in a selected orientation so that it can be advantageously coupled with the roof panels 24 without requiring that the base support member 28 be disposed in a particular relation to the preexisting roof 12, and furthermore, the surface of the upper beam 30 used to support the corrugation support clip 48 is substantially independent of the grade or slope of the underlying planar surface 22 of the preexisting roof 12 and of the transverse vertical alignment of the spacer webs 36. As previously stated, each of the spacer webs 36 forming the web assembly 32 of the adjustable roofing sup port spacer 26 is positioned independently of the adjacent spacer webs so that the desired relationship between the upper beam 30 and the base support members 28 of the adjustable roofing support spacer 26 is maintained.

When the adjustable roofing support spacer 26 has been properly positioned on the preexisting roof 12 so that the upper beam 30 of the adjustable roofing support spacer 26 is disposed in the selected position and each of the adjacent adjustable roofing support spacers 26 has likewise been so positioned, the roof panel members 24 are positioned on the upper beam 30 of the adjustable spacers 36 and secured thereto by any suitable means, such as a corrugation support clip 48 and suitable fastening means, such as self-drilling, self-tapping screws (not shown).

In those instances where the plane of the new roof panels 24 and the plane of the upper surface of upper beam 30 diverge so as to make it difficult to connect these two together, the upper surface of upper beam 30 may be angularly adjusted to coincide substantially parallel with the slope of new roof panels, or a suitable adapter clip may be interposed between the two (such as represented by the clip 48 in FIG. 3).

In order to more fully describe the present invention the method of erection of the roof system 10 as shown in FIGS. 1A thru 3 will now be described. In the formation of the roof assembly 10 on the preexisting roof 12 of the building structure 14, the initial construction procedures involve the removal of any interfering caps and foreign matter which may be on or connected to the top portion of the preexisting roof 12. Once this is achieved, an optional vapor retarder and insulation may be installed, and the adjustable roofing support spacers 26 are erected on the preexisting roof 12 as follows. The base support members 28 of the adjustable roofing support spacer 26 are secured to the preexisting roof 12 by a plurality of self-tapping, self-drilling screws or other means described hereinbelow. The adjustable web assembly 32 of the adjustable roofing support spacer 26, which comprises a plurality of spacer webs 36, is connected to the base support members 28 and the upper beam 30 so that the upper beam 30 is disposed in a desired position at a desired selected height above upper surface 22 of the existing roof 12. The adjustable roofing support spacer 26 is temporarily braced so that the spacer web 36 is maintained in its proper position during construction of the roof system 10.

The base support members 28 of the adjustable roofing support spacer 26 are then positioned upon the preexisting roof 12 and secured thereto, such as by self-tapping, self-drilling screws 34. The number of adjustable roofing support spacers 26 employed in the formation of the roof assembly 10 will vary depending upon the overall length of the roof panels 24, but desirably the adjustable roofing support spacers 26 are positioned on the preexisting roof 12 so as to be spaced approximately five feet apart. Once the base support members 28 of each of the adjustable spacers have been secured in the desired position on the preexisting roof 12, a tightline is attached to a new roof high point and a new roof low point. The new roof high and low points are not shown in the drawings. The adjustable web assembly 32 of each of the adjustable roofing support spacers 26 disposed between these high and low points is elevated such that when the upper beam 30 is secured to each of the adjustable web assemblies 32, and the first end portion 38 is secured to the base support members 28, the upper beams 30 are substantially aligned relative to the tightline Upper beams 30 of adjacently aligned adjustable roofing support spacers 26 may be joined end to end.

When the roof panels 24 are of a length which requires multiple panel spanning across the upper beams 30 of the adjustable roofing support spacers 26, the roof panel members 24 are end lapped and connected together in a manner heretofore known in the roofing art. The placement of the roof panel members 24 continues across the upper beams 30 of the adjustable roofing support spacers 26 until approaching the opposite side of the building structure 14. At this point, flashing assemblies are secured to either side of the building structure 14. Similarly, a flashing assembly may be used to interconnect the roof panels 24 and the end wall of the building.

It is often desirable to incorporate additional insulation material, such as insulation 60, on the preexisting roof 12 of the building structure 14. In such instances, the insulation 60 is positioned on the preexisting roof 12 as shown in FIGS. 1A and 1B prior to the attachment of the roof panel members 24 to the upper beams 30 of the adjustable roofing support spacers 26 as heretofore described. Alternately, or in addition to the insulation 60, insulation can be placed to extend over, and be supported by, the upper beams 30 prior to placement of the roof panels 24 thereupon. This latter method of insulation placement is sometimes required by panel manufacturers to protect the underside of the roof panels from corrosion potentially effected by moisture condensation.

Another embodiment of the adjustable roofing support spacer which is useful at or near the building eaves is shown in FIG. 4. An adjustable roofing support spacer 26A, a z-shaped assembly, comprises an upper web member 62, an upper flange 64, a lower web member 66 and a lower flange 68. The upper web member 62 is overlappingly disposed over the lower web member 66 and is adjusted to the selected height of the new roof in accordance with procedures discussed hereinabove. The lower flange 68 is connectable to the preexisting roof 12 by suitable fasteners, while the roof panels 24 are supportable by, and attachable to, the upper flange 64. The upper web 62 is connected to the lower web 66 by fasteners 70, such as by nuts and bolts. These nuts and bolts 70 may be inserted through aligning slots 72 in both the upper web 62 and the lower web 66 such that loosening the fasteners 70 will allow the two members to increase or decrease the amount of overlapping and thus the distance between the upper and lower flange 64 and 68. After the desired initial overlapping has been accomplished using the adjustable fasteners 70, the overlapping position is secured by permanently interconnecting webs 62 and 66 with non-slip connection means such as weldments 73, or self-tapping, self-drilling screws (not shown) or the like.

Another feature of the present invention is presented by bracing bars 74, one of which is shown in FIG. 4. The bracing bars 74 serve to impose rigidity to the adjustable roofing support spacer 26A as such braces are attached to the preexisting roof 12 (or to any convenient portion of the building 14) and to the support spacer as shown. This rigidity is then imparted to the other support spacers 26 by way of the diaphragm formed by the interlocked roof panels 24. Thus, structural stability is effected for the roof system 10 while permitting temperature expansion of the interlocked roof panels 24 by way of limited rotation of the support spacers 26. This unique feature of the roof panel members 24 being attached directly to a laterally stable element, such as represented by the braced adjustable roofing support spacer 26A, serves as a structural connection which stabilizes a portion of the roof section. This attachment, in combination with the design of the adjustable roofing support spacer 26 and the diaphragm action and column strength of the roof panel members 24, enables the roof panel members 24 to retain their substantial roof watertightness and load capacity and stability as the roof panel members 24 expand and contract due to temperature variations or to loading. In other words, the design of the adjustable roofing support spacers 26 is such that there is enough flexibility in the adjustable roofing support spacers 26 to allow the spacers to rotate slightly back and forth as the roof panel members 24 move due to temperature variations, while the pinned connection between roof panel members 24 and the laterally structurally stable support spacer 26A, supported by bracing bars 74, provides a stable roof system in which the adjustable roofing support spacers 26 and 26A will not collapse laterally when the roof system 10 is subjected to loading.

FIG. 5 shows another embodiment of an adjustable roofing support spacer 26B which has an adjustable web assembly 32B comprising a first flange member 80A and an opposed second flange member 80B, a center flange member 82 and first and second spacer web members 36A and 36B. The center flange member 82 is connectable to the upper beam 30B of the support spacer 26B by any suitable means such as a weld, fastener or the like.

The adjustable web assembly 32B may be factory attached to the upper beam 30B so it is substantially parallel and nested with the upper beam for ease of shipping and later on-site erection, as is shown in FIGS. 6A and 6B. The spacer webs 36A and 36B can be assembled in the factory in such a manner as to lay adjacent to the upper beam 30B, the assembly 32B thus being transportable to the field in a compact manner to minimize shipping costs and to use factory equipment to make the connection rather than less reliable and more costly field application, and also to assure that the two pieces are in the proper relationship with each other upon reaching the field. It is time consuming and expensive to locate, separate and bring various components into proper position at an end use location.

Field assembly of the upper beam 30B and adjustable web assembly 32B to the base support member 28B of the support spacer 26B is accomplished by moving the web members 36A and 36B out from the upper beam 30B to an angular position so as to approximate the selected height of the new roof from the upper beam 30B to the base support member 28B. The flange members 80A and 80B are bent to a position that these flanges are substantially coplanar with the flange of the base support members 28B. Final adjustment is made by moving flanges 80A and 80B such that the upper beam 30B is raised to the height of the tightline guide discussed hereinabove. The adjustable web assembly 32B may have bend scores 84 made during the manufacturing process to facilitate the ease of bending, as shown in FIG. 5 at the first and second end flanges 80A and 80B and at the opposing sides of the center flanges member 82. The flanges 80A, 80B are secured to the base support member 28A by self-tapping, self-drilling screws 34 or other suitable means known in the art.

FIG. 7 is a view of the present invention utilizing the adjustable web assembly 32B showing the position of the first and second web members 36A and 36B where the plane of the upper beam 30B is sloped in relationship to the plane of the base support members 28B. Erection of this embodiment would be similar to that discussed hereinabove and further description of same is not believed necessary.

FIG. 8A illustrates a side, view of a base plate 28C, which can be used in lieu of the base support member 28B in the present invention. The base plate 28C is connectable by the adjustable web assembly 32B via first and second end flange members 80A and 80B by the self-tapping, self-drilling screws 34. As is the case for all of the base support members 28, it is sometimes desirable that the base plate 28C be water proofed by bedding it in a base coat of hot tar 86, or other suitable sealant, to maintain the current level of watertightness of the preexisting roof during construction of the new roof. The base plate 28C, also shown in top plan view in FIG. 8B, is attachable to the preexisting roof 12 by any suitable means.

In certain instances it may be desirable to connect flange members 80A and 80B directly to the underlying secondary structurals. This is accomplished by first removing portions of the preexisting roof 12 so that flange members 80A and 80B rest on and are connected to the underlying purlins or joists.

The adjustable roofing support spacers 26 can take a number of forms. In the preceding discussion, all of the drawings with the exception of FIG. 7 have depicted the upper beam 30 disposed in final assembly in substantially a horizontal spatial orientation. FIG. 7, on the other hand, introduced the possibility of angularly disposed upper beams for the adjustable roofing support spacers; this can be accomplished using identical web assemblies 32B, or if required, by varying the lengths of members 36B adjacently disposed. The reason for this nonhorizontal disposition is to service those applications in which the upper beams of the support spacers are preferably disposed to extend from the eave (by way of example) to the ridge of the roof, or in a manner which accommodates unusual roof shapes, such as circular or curvilinearly shaped roofs, conforming to any required configuration and disposition of the upper support beams 30. Further, while such upper support beams have been discussed with regard to one or more lower beams that are generally parallel to the supported upper beams, the following examples of other forms of the adjustable roofing support spacers will display the flexibility available, to wit, that one or more upper support beams can be supported in any selected spatial disposition and can be supported by random attachment to one or more supporting lower beams or point contacts with the underlying preexisting roof or its underlying secondary structural members.

FIG. 9 depicts an adjustable roofing support spacer 26C having a lower support beam 28C, also referred to herein as a base support member, and an upper support beam 30C. A plurality of interchangeable spacer web members 36C are attached via appropriate fasteners, such as self-drilling, self-tapping screws, to the upper and lower support beams 30C, 28C. FIG. 9 depicts a sloping preexisting roof 12, with the upper support beam 30C supported in generally horizontal disposition while the lower support beam 28C follows the slope of the preexisting roof. The spacer web member 36C are paired with one pair 90 shown in crossed configuration while another pair 92 shown as separated, which are optional arrangements. In each of the pairs 90, 92 one of the spacer webs 36C is disposed on each side of the web portions of the upper and lower beam members 30C, 28C, each of which is of angle iron profile. This spacer web positioning is more clearly shown in the end view of FIG. 9A, and serves the purpose of more uniformly supporting the adjustable roofing support spacer 26C. As described above, the spacer web members 36C are preferably factory installed on the upper support members 30C and shipped for on site assembly to the lower support member 28C which is achieved by simply pivoting the spacer web members 36C to the required positions and field connecting same to the lower support beam 28C. Another feature gained by placing spacer web members 36C on opposite sides of the adjustable roofing support spacer 26C is that, when folded in the shipping position, all those on a given side may extend in the same direction, thus permitting longer such members 36C to be used than would otherwise be possible.

FIG. 10 depicts an adjustable roofing support spacer 26D of similar construction as discussed above with some exceptions, chiefly in that a single upper beam 30D is supported by multiple base support members 28D. The web members 36D are preferably first connected to the base support members 28D, and field adjustability is obtained by double rotation of web members 36D to the required position so as to achieve the desired geometric position. Interconnecting these members are web assemblies comprising paired spacer web members 36D. The lower end portions of the spacer web members 36D are pivotally connected to the base support members 28D which are also viewable in the end view of FIG. 10A. These lower end portions can be attached to the base support members 28D via individual fasteners, as shown in FIG. 10A, or a single fastener can be used to attach adjacently disposed lower end portions of the web members 36D.

As described above, the spacer web members 36D can be pivotally attached to one of the support members at the factory and shipped with the spacer support members 36D extending along their respective base support members 28D. At the field site, the spacer web members 36D are pivoted into the required position; also, because of the angular offset being that as shown, each of the spacer web members 36D must be bent to the required angular disposition. To assist in this shaping, the lower ends of each of the spacer web members 36D has the double direction hinge portion as depicted in FIGS. 11 and 11A. These figures show a portion of one of the base support members 28D and a lower portion of one of the spacer web members 36D which has an extending tab portion 94 pivotably connected to the base support member 28D via a fastener 96. The longitudinal axis 98 of the base support member 28D is indicated, as is the axis 100 which is normal to the longitudinal axis 98 thereof. The spacer web member 36D is readily pivotable on the fastener 96 away from the longitudinal axis 98 as denoted by the arrow direction 102, and the spacer web member 36D is also bendable at its tab portion 94 away from the normal axis 100 as depicted by the arrow direction 104. This double pivotation capability of the hinge attachment of the spacer web members 36D to the base support members 28D permits adjustment to the angularity of such members as shown by way of example in FIGS. 10 and 10A when it is required to dispose the upper support beam 30D at a selected height in the manner and for the purpose described earlier hereinabove with regard to the adjustable roofing support spacers 26, and with like field attachment to the upper support beams 30D.

Base Support members 28D may be replaced by a series of base connections similar to that shown in FIGS. 8A and 8B.

Figure 12:
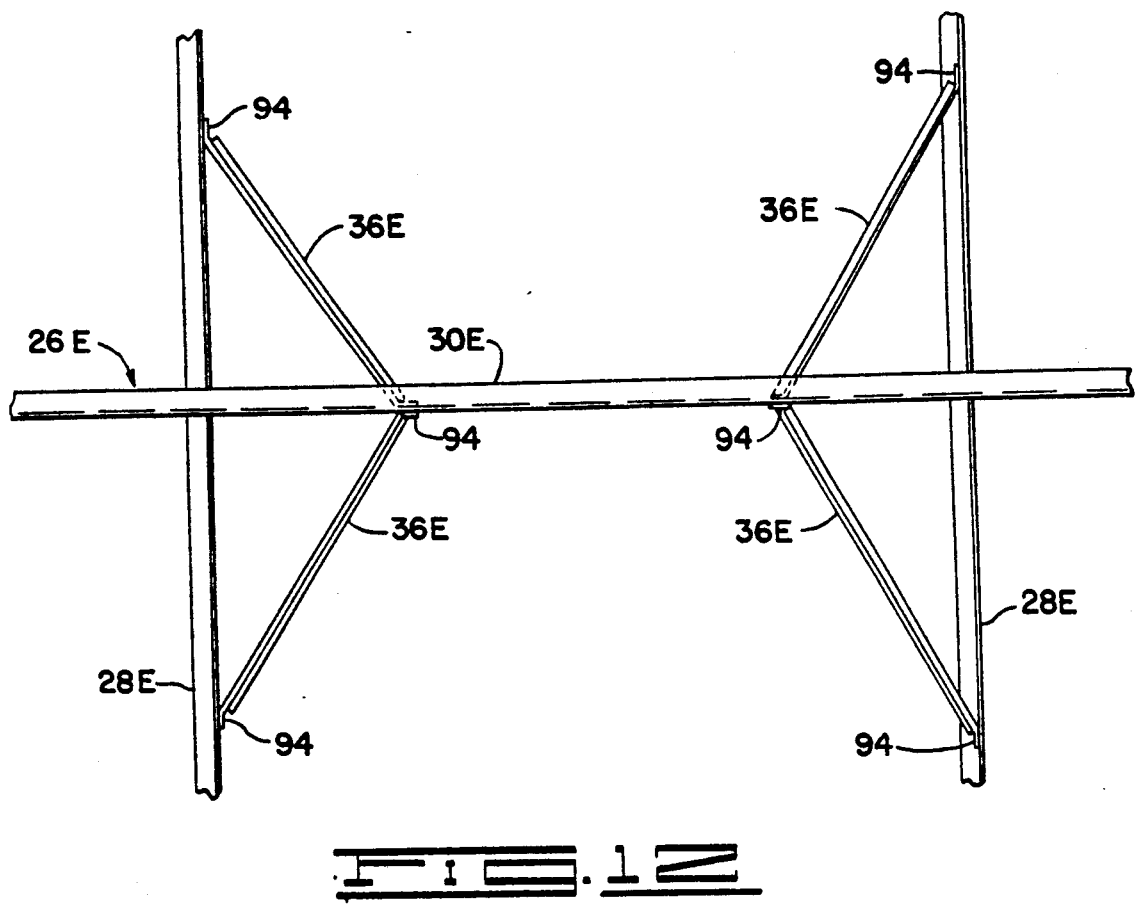
FIGS. 12 and 12A are top plan and side elevational views of a alternate support spacer member.
Figure 12A:
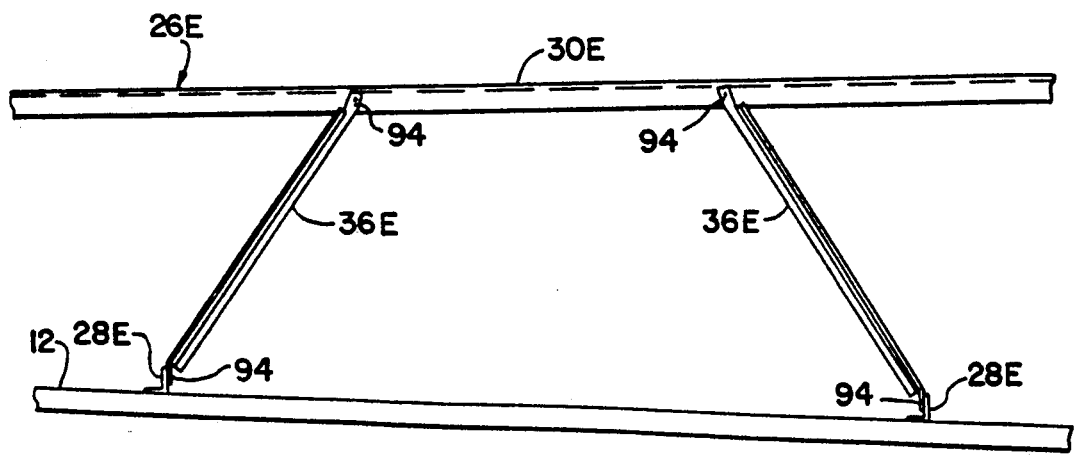

FIG. 12 shows a plan view of yet another adjustable roofing support spacer 26E which again is of similar construction as above described with some exceptions. A single upper beam 30E is supported by multiple base support members 28E, with pairs of spacer web members 36E extending from each base support member 28E at intervals therealong. In this case, each end of the spacer web member 36E has the double rotation hinging tab portion 94 that was described hereinabove with reference to FIGS. 11 and 11A. The angular disposition of the members also is viewable in FIG. 12A, a side elevational view. The locations of pairs of the spacer web members 36E serve to produce countering forces for stability as in the other forms of the adjustable roofing support spacers 26 described hereinabove. Assembly need not be described further at this point since this will be clear from the description already provided for the other forms of the support spacers.

FIG. 13 shows a plan view of one more version of the present invention in an adjustable roofing support spacer 26F which features an upper support beam 30F supported by generally parallel lower or base support members 28F which are in turn disposed upon the preexisting roof 12. Adjustable web assemblies are provided and are comprised of spacer web members 36F which interconnect the upper and lower beams 30F, 28F to support the upper beam 30F at a selected height and spatial orientation above the preexisting roof 12. The spacer web members 36F are equipped with the double hinging tab portions 94 at each end thereof, but are only factory assembled to one of the upper and lower beams 30F, 28F, preferably to the upper beam 30F, with the usual attachment to the lower beam 28F at the field site as above described.

Figures 14A, 14B:
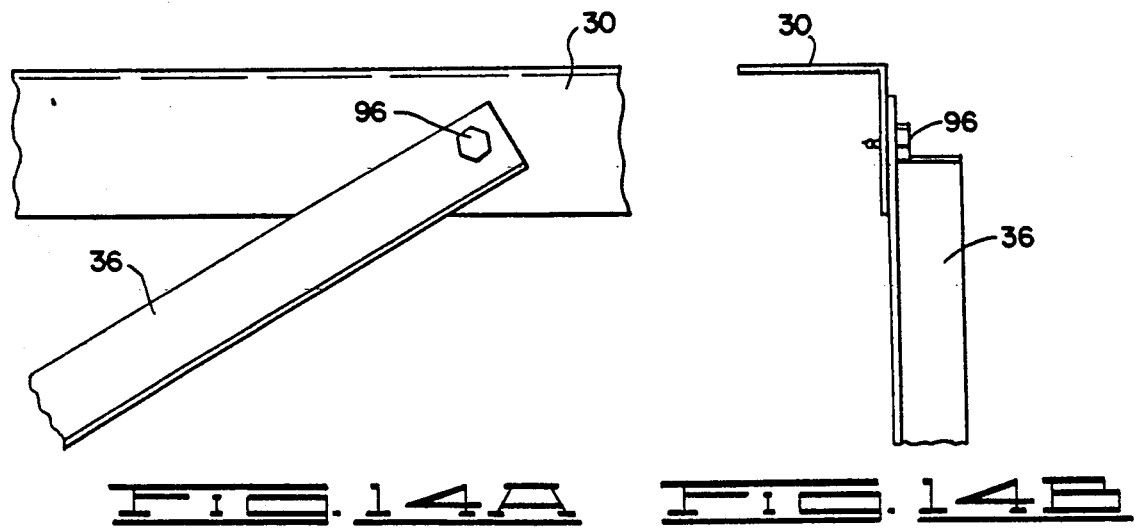
FIG. 14A and 14B are side and elevational views, respectively, of a single direction hinge connection.
Figures 14C, 14D:
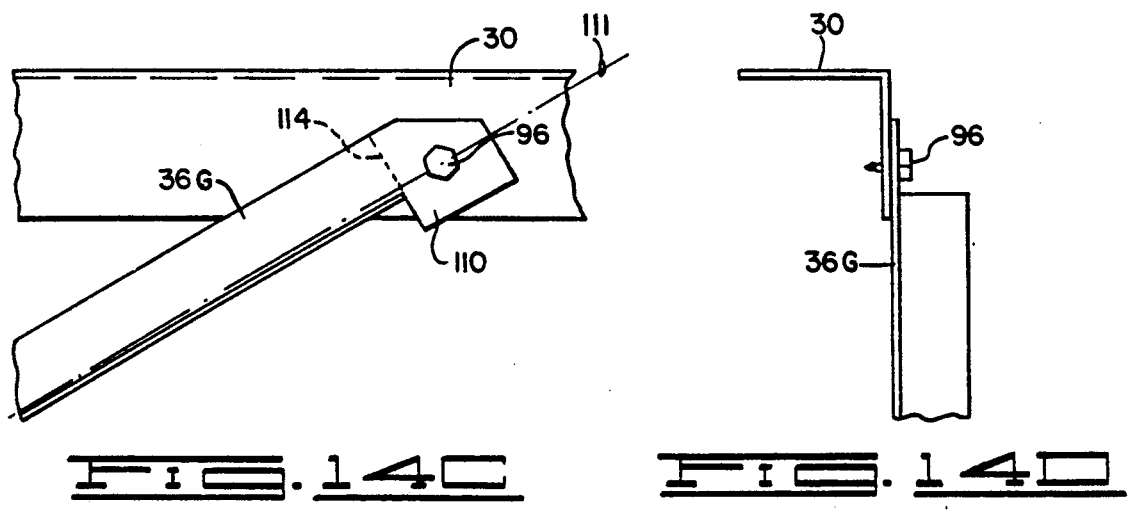
FIGS. 14C and 14D are side and elevational views, respectively, of an alternate single direction hinge connection.

At this point in the description of the various forms of the adjustable roofing support spacers 26, attention is directed to FIGS. 14A and 14B which are, respectively, side and end elevational views of an attachment of one of the spacer web members 36 to one of the support beams, with the upper support beam 30 being shown. These views depict the pivotal attachment of the angle iron profile spacer web member 36 via the fastener 96 through a web portion thereof. While this is generally satisfactory, an improved attachment of a modified spacer web member 36G is shown in the similar views of FIGS. 14C and 14D. The end portion of the spacer web member 36G has a web extension portion forming a hammer head pivot 110 which permits placement of the fasteners 96 in an advantageous alignment with centroid 111 of spacer web member 36G, the centroid 111 being determined by the mass distribution of the spacer web member 36G and determinable via conventional calculation methods. This hammer head pivot 110 adds stability to the spacer web member 36G over that of the spacer web member 36C shown in FIGS. 14A and 14B and is desirable in certain configurations of the adjustable roofing support spacers 26. Further, it will be recognized that the hammer head pivot 110 can also serve as a double hinge by bending same along dashed line 114 shown in FIG. 14C.

FIGS. 15-16

Figure 15:
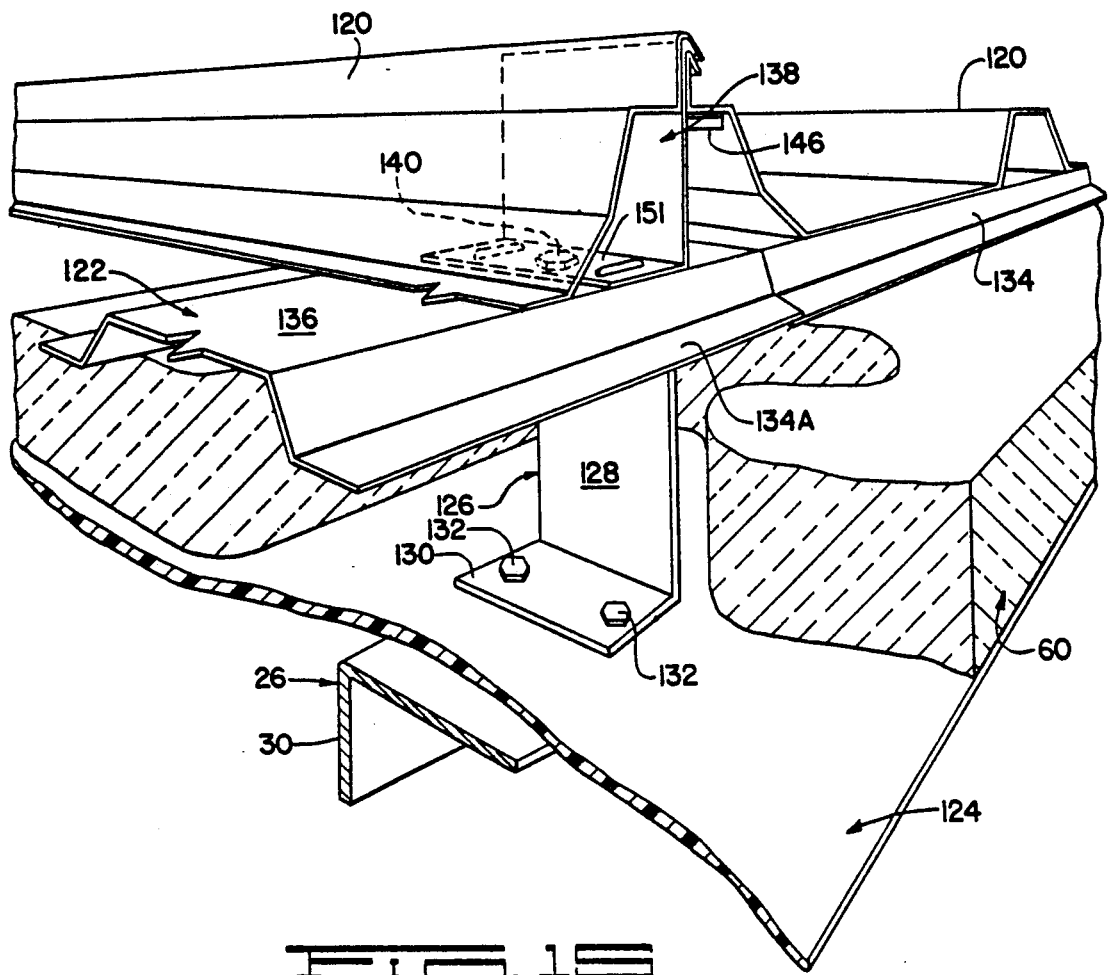
FIG. 15 is a perspective view, in partial cutaway detail, of support assembly interposed between the roof panels and the adjustable roofing support spacers of FIG. 1.
Figures 15A, 15B:
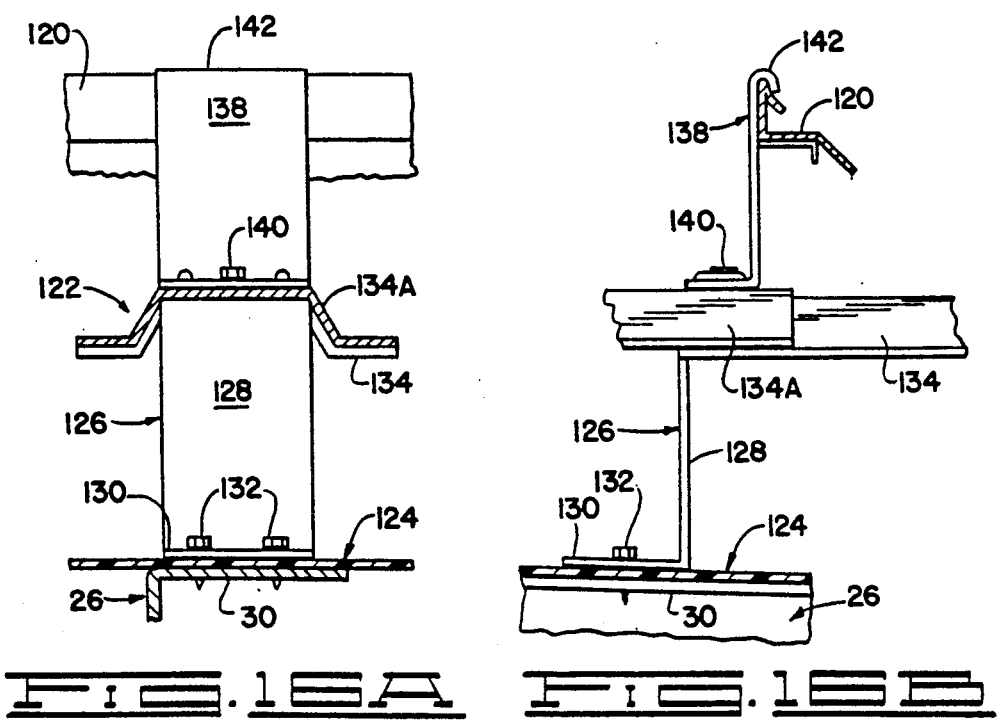

As mentioned above, a perspective view of a partial cutaway roof system is shown in FIG. 1 in which a portion of the pre-engineered building roof system 10 is supported by a building structure 14. The building structure 14 has the preexisting roof 12 which supports a plurality of the adjustable roofing support spacers 26 which extend upwardly to support the roof panels 24. The roof panels 24 can be attached directly to the upper support beams 30 as discussed, or the panels can be supported in a number of ways, one of which is depicted in FIG. 15.

Roof panels 120, of the profile taught in U.S. Pat. No. 4,597,234 referenced hereinabove, are supported on support assemblies 122 which are attached to the upper beam 30 of the adjustable roofing support spacers 26. The roof panels 120, only portions of which are shown, are depicted as being standing seam panels with interlocking edge seams supported by clip portions of the panel support assemblies 122, as will become clear below.

A flexible facing membrane 124 is extended substantially tautly over the support spacers 26 beneath the panel support assemblies 122 and secured thereby to the upper beams 30. A layer of compressible insulation, such as the insulation 60, is supported by the membrane 124 beneath the roof panels 120 in substantially its pre-installed expanded state. As for the type of blanket insulation 60 to be used, it will be noted that such insulation is usually a laminated product that comprises a layer of compressible mineral insulation or chopped qlass fiber insulation which is bonded via an adhesive to a flexible facing membrane. However, other types of insulation, such as blown shredded paper, glass fibers and foam, may be used advantageously. The membrane 124 may consist of one or more thin layers of materials such as aluminum foil or vinyl plastic which serves to provide a vapor barrier for the building envelope. A typical blanket batt insulation is made by the Mizell Brothers Company of Dallas, Tx., which is a product comprising a laminated facing membrane made of a layer of vinyl, a layer of fiberglass scrim, and a layer of aluminum foil. Bonded to the facing membrane is a thick layer of compressible fiberglass material.

The membrane 124 may also be a separate, independent member which provides a continuous membrane vapor barrier and also serves as a support platform for the insulation layer 60. An independent membrane preferably will be a facing flexible facing membrane about one to two mils in thickness with an embedded scrim, such as Fiberglass or nylon, capable of taking tensile load. The membrane 124, if separate to the insulation, is placed over the upper support beams 30 by attaching it between convenient support members, such as a building wall or roof structurals, so that the membrane extends substantially taut there-between. Once the membrane is tautly in position, the insulation 60 is simply placed upon the membrane Of course, the positioning of the membrane 124 and insulation 60 over the upper support beams 30 is intended as an optional treatment to the provision of a similar membrane and insulation directly upon the pre-existing roof 12 as discussed above with reference to FIGS. 1A and 1B. Further, there will most likely be applications where both insulations are installed, or in which the insulation and/or membrane can be eliminated altogether.

The panel support assembly 122 shown in FIG. 15 comprises a plurality of base clips 126 each of which has a median web portion 128. At the lower end of the median portion 128 there is formed a leg portion 130 through which self-tapping, self-drilling screws 132 extend to secure the base clip 126 to the underlying support spacers 26. As shown in FIG. 16A, the attachment of the base clips 126 serve to secure the flexible membrane 124 to the top of the upper support spacers.

The panel support assembly 122 also comprises a plurality of panel support beams 134 that are generally elongated channel shaped members arranged in overlapping, end-to-end relationship. As shown, the panel support beams 134 extend generally parallel to the underlying upper support beams 30, but where desired, the panel support beams can be disposed to run perpendicularly to, or otherwise angularly to, the underlying upper support beams 30. Preferably, the base clip 126 is formed as an integral portion of the panel support beam 134 to which it is attached. That is, each of the base clips 126 is formed as an extension of the web portion of its channel shaped support beam 134 and is press formed to extend downwardly therefrom to support one end of its respective support beam 134 at a predetermined distance above the underlying support beam 30. This is for the purpose of providing clearance below the panel support beam 134 in order to provide space for the insulation material 60 to be positioned thereunder, and further, each base clip 126 has the capability to flex to accommodate expansion and contraction of the roof panels 120.

The roof panels 120 are secured to the panel support beams 134 and rest on, and are connected to, upper support surfaces 136 thereof which provide support for the medial portions of the roof panel members 120 for both inwardly and outwardly directed load. As shown in FIGS. 16A and 16B (which show only the male side lap joint of one roof panel 120 in order to display the clip), an upwardly extensive clip member 138 is secured to the upper support surface 136 of the overlapped panel support beams 134, 134A via a screw 140. An upper hook portion 142 of the clip member 138 is formed to hook over the apex portion of the male side lap joint of the roof panel member 120.

Once the membrane 124 is tautly secured to selected anchoring points and stretched over the support spacers 26, the base clips 126 are secured in place via the screws 132, and the panel support beams 134 are overlappingly aligned along each of the support spacers 26. The standing seam roof panel members 120 are snapped into overlapping and interlocking relationship over the clip members 138.

FIGS. 17-23B

Referring now to FIGS. 17A through 23B various apparatuses are shown for securing a lower member of the adjustment roofing support spacer 26 to an underlying secondary structural support such as the joists 20 shown in FIGS. 1A and 1B. While joists 20 are shown in these figures, the adjustable roofing support spacers 26 could also be attached to roof purlins or other secondary support members for transmitting loads from the roof panel members 24 through the adjustable roofing support spacers 26 to the underlying secondary structure.

When the base support member of the adjustable roofing support spacers 26 run parallel to the existing metal deck 29 and perpendicular to the joists 20, (FIG. 1A) the support spacers 26 are called "cross directional" adjustable roofing support spacers. The new roof panels 24 are parallel to the joists 20; and the new roof panels 24 are sloped from right to left downwardly toward the wall 18. Ideally, the lower member of the adjustable roofing support spacer 26 is disposed directly above a portion of the top of the joist 20 so that it can be secured thereto and the inwardly directed, outwardly directed and shear loads transmitted directly to the top of the joist 20. This feature of direct loading onto the underlying secondary support is particularly important when the load carrying ability of the existing built-up roof 12 is in question. As mentioned above, FIGS. 17A through 23B illustrate the attachment of the adjustable roofing support spacers 26 directly to the top of the joists 20.

On the other hand, when the lower member of the adjustable roofing support spacers 26 extend perpendicularly to the existing metal deck 29 and parallel to the joists 20 (FIG. 1B), the support spacers 26 are called "unidirectional" adjustable roofing support spacers. The new roof panels 24 are perpendicular to the joists 20 with the roof panels 24 from right to left sloped downwardly toward the building wall 18. In this illustration the lower members of the adjustable roofing support spacers 26 take the form of the base support members 28 described hereinbefore with reference to FIGS. 2A and 2B. The base support members 28 are designed to spread the load uniformly across the upper surface 22 of the existing roof 12. In this example, the existing roof 12 will have determined to be adequate to carry the concentrated loads placed thereon by transferring the load from new roof panels 24 to adjustable roofing support spacers 26. Also, as long as the existing roof 12 is adequate for carrying the predetermined loads to be placed thereon, the base support members 28 may be placed directly above the underlying parallel joists 20 or anywhere between two parallel joists 20.

Figure 17A:
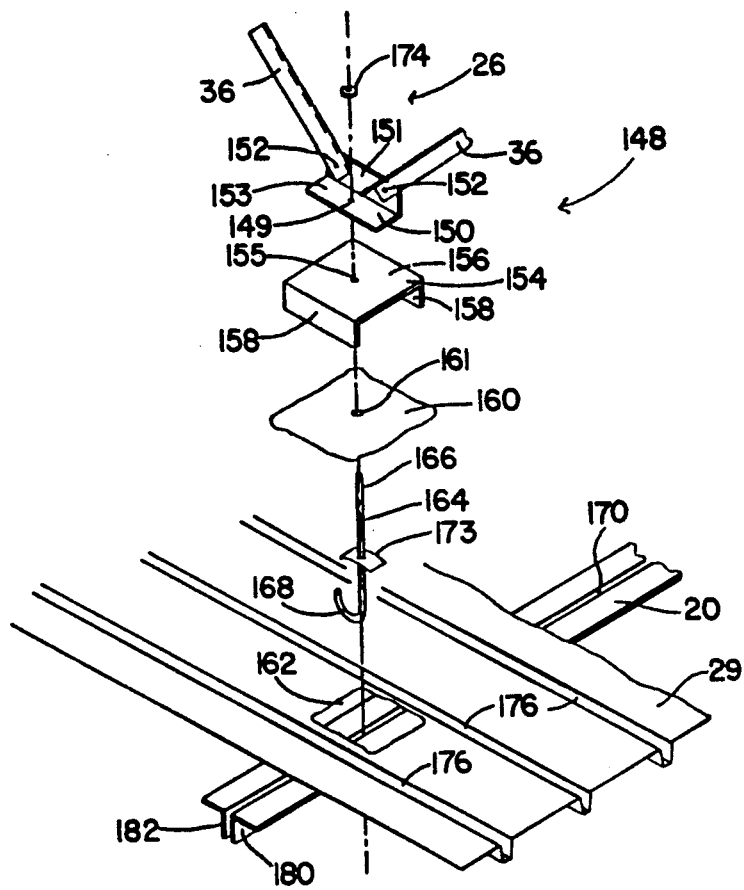
FIG. 17A is an exploded view of a "C" shaped support channel used for securing the adjustable support spacer lower member to an existing joist.

FIG. 17A illustrates an exploded view of one type of an apparatus 148 for securing a lower member 150 of an adjustable roofing support spacer 26 to a pair of spacer webs 36 via pins 152. The lower member 150 is centered on top of a C-shaped support channel 154 having a base 156 with legs 158. A vapor retarder membrane 160 is placed between the bottom of the channel 154 and the top of a hole 162 in the existing metal deck 29. When the lower member 150 is secured to the top of the joist 20, exposed below the hole 162, the vapor retarder membrane 160 acts to prevent air and vapor movement through the hole 162 in the deck 29. The vapor retarder membrane 160 may be made of pressure sensitive tape or any similar type material possessing reasonable vapor retarding qualities. The vapor retarder membrane 160 is shown in FIG. 17A but is not shown in the additional figures. However, it may be used whenever a hole is required in the existing deck 29 and vapor retardency is desired.

To secure the lower member 150 to the top of the joist 20 a J-bolt 164 with an upper threaded end 166 and a lower J-end 168 is used. The lower J-end 168 of the J-bolt 164 is positioned through the hole 162 in the deck 29 and through a space 170 in the joist 20. The J-bolt 164 is then turned ninety degrees and raised to engage a lip 172 making up one side of the top of the joist 20. A tinnerman nut 173, or other devices capable of moving one direction and resisting movement in the opposite direction, is slid around the J-bolt 164 and lowered to engage the top of the joist 20 to hold the J-bolt 164 temporarily in place. The upper threaded end 166 is inserted through an aperture 161 in the membrane 160, then through aperture 155 in the channel 154, and finally through aperture 149 in the lower member 150. A nut 174 is then threaded on the upper threaded end 166 of the J-bolt 164.

Figures 17B, 17C:
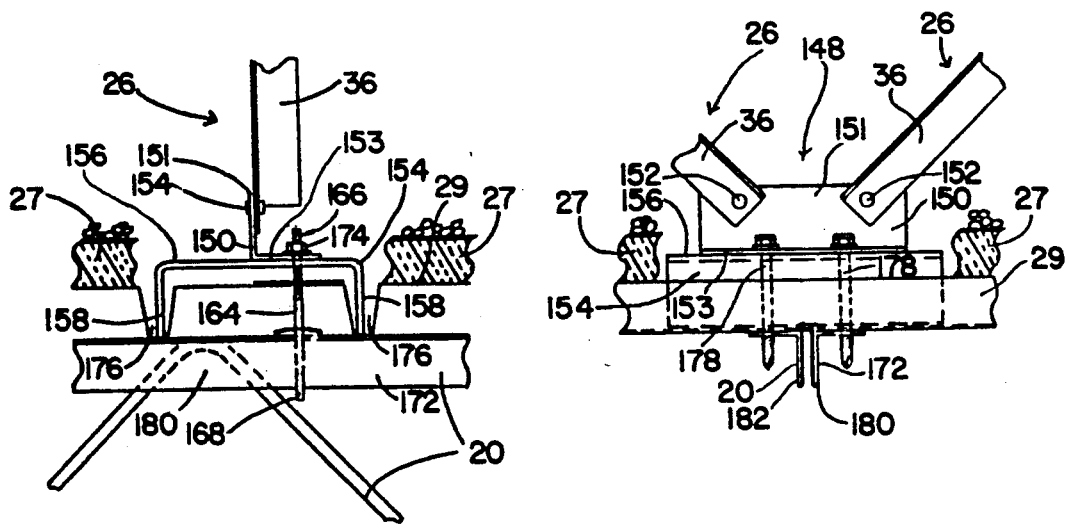
FIGS. 17B and 17C are end and side views of the support channel and support spacer lower member.

FIGS. 17B and 17C illustrate an end view and side view, respectively, of the apparatus 148 wherein the lower member 150 is secured to the top of the base 156 of the channel 154. The lower member 150 is made up of a vertical flange 151 and a horizontal flange 153. The webs 36 are pinned to the vertical flange 151; while the horizontal flange 153 is used to secure the lower member 150 to the channel 154 using the J-bolt 164.

To prevent crushing of the metal deck 29, the legs 158 of the C-shaped support channel 154 are received in adjacent corrugations 176. This allows the legs 158 to bear on a single thickness of existing metal deck 29 which rests directly on top of the joist 20 with only the thickness of the existing metal deck 29 therebetween so that direct load transfer is applied thereto. The built-up roof 27 over the metal deck 29 is shown cut away from around the hole 162 in FIG. 17A. The built-up roof 27 is normally made up of insulation, roofing felt, asphalt weatherproofing and gravel texturing.

FIG. 17C illustrates an alternate method for securing the lower member 150 to the base 156 of the support channel 154 using self-tapping, self-drilling screws 178. The screws 178 eliminate the need of the J-bolt 164. To simplify the drawings, the screws 178 are only shown in FIG. 17C, such screws are considered an alternate for each of the embodiments described hereinbelow although not shown further. The use of the self-drilling screw 178 eliminates the need to cut hole 162 through existing metal deck 29, thus reducing the work and time required to complete the connection.

As illustrated, a pair of screws 178 are drilled through the horizontal flange 153 of the lower member 154, through the base 156 of the channel 154, through the deck 29 and into opposite sides 180 and 182 of the joist 20. When the screws 178 are tightened the lower member 150 is held fast against the top of the channel 154 with the legs 158 of the channel 154 riding in the corrugations 176 of the existing deck 29. The C-shaped support channel bridges over the corrugation of existing metal deck 29 and inwardly directed load is diverted from the corrugation.

FIG. 18A and 18B illustrate an end view and side view, respectively, of an apparatus 184a for securing the adjustable roofing support spacer 26 to the joist 20. Apparatus 184a eliminates the lower member 150 (FIGS. 17A, 17B and 17C). Thus, the support channel 154 acts as a lower member of the support spacer 26, with the webs 36 pinned to the side of one of the channel legs 158. The support channel 154 is secured to the top of the existing deck 29 using the J-bolt 164 as heretofore described with reference to FIG. 17A. The J-bolt 164 is preferably positioned as close to leg 158 as is permissible considering the geometry of the connection.

FIGS. 19A and 19B illustrate an end view and a side view, respectively, of another apparatus 186 to secure the lower member 150 of the adjustable roofing support spacer 26 to the joist 20. In this example, a bearing plate 188 is received directly on top of the built-up roof 154 is required, while neither the hole 162 or the support channel roof 27 and deck 29 which is large enough to insert the lower J-end 168 of the J-bolt 164 therethrough so that the J-bolt 164 can be inserted through the space 170 and the J-end 168 thereof turned to engage the lip 172 of the side 180 of joist 20. The bearing plate 188 spreads the load from the support spacer 26 directly above the underlying joist without crushing the top of the built-up roof 27 and the underneath deck 29. If desired, a hole the size of the bearing plate 188 can be made in the top of built-up roof 27 so that the bearing plate 188 can rest directly on top of the existing deck 29.

The bearing plate 188 may be a solid plate of suitable material such as steel plate or it may be a light gauge corrugated steel sheet formed to spread the inwardly directed load received from support spacer 26 over a suitable area of roof 27 so that roof 27 is not crushed. If a corrugated sheet is used, the corrugations may be about 1/8 " high and have a pitch of about 1".

FIGS. 20A and 20B show an end view and a side view, respectively, of another apparatus 190 for securing the adjustable roofing support spacer 26 to the joist 20. In this embodiment a lower member 192 of the spacer 26 has a slimline L-shaped configuration having an elongated vertical flange 194 pinned to the spacer webs 36, and a narrow horizontal flange 196 positioned in the bottom of the corrugation 176 of the deck 29. A hole is provided in the built-up roof 27 for inserting the horizontal flange 196 in the corrugation 176. A pair of self-drilling screws 200 are then drilled through the horizontal flange 196, the deck 29 and through the opposite sides 180 and 182 of the joist 20. The load of the support spacer 26 is transmitted directly through the lower member 192, through the bottom of the corrugation 176 in the deck 29, and onto the top of the joist 20.

Figure 21A:
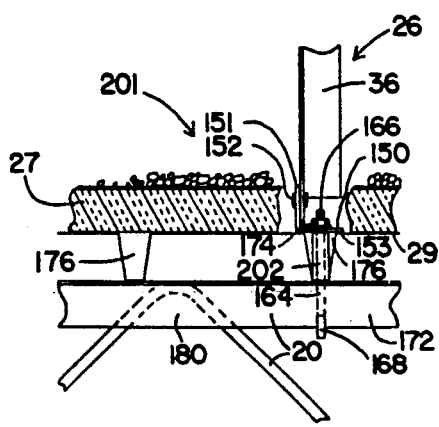
FIGS. 21A and 21B are end and side views of the adjustable support spacer lower member received on top of the existing roof deck using a spacer and J-bolt received in a corrugation of the roof deck and secured to an existing joist.
Figure 21B:
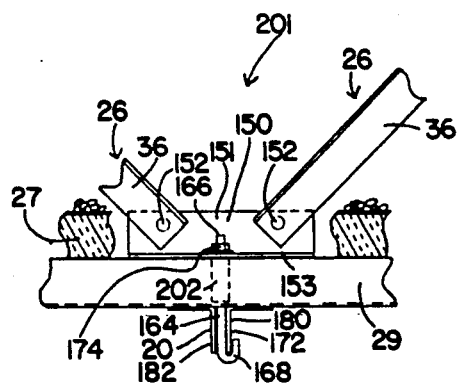

FIGS. 21A and 21B illustrate yet another apparatus 201 for securing the adjustable roofing support spacer 26 to the joist 20. The apparatus 201 includes a spacer 202 having a bore extending therethrough. The J-bolt 164 is positioned through the bore of the spacer 202 to secure the lower member 150 of the adjustable roofing support spacer 26 to the joist 20. The horizontal flange 153 of the lower member 150 is received through an opening in the built-up roof 27 of the existing deck 29. Flange 153 rests above the top of and along the length of the corrugation 176. The spacer 202 is dimensioned to have a length the same as, or greater than, the depth of the corrugation 176, and a width equal to or less than the width of the bottom of the corrugation 176 substantially as shown in FIG. 21A. Thus, the inwardly directed load from the webs 36 and lower member 150 are transmitted to the spacer 202, and onto the top of the joist 20 without crushing or damaging the existing deck 29 and causing eccentric loading on the deck 29 and joist 20.

Figure 22A:
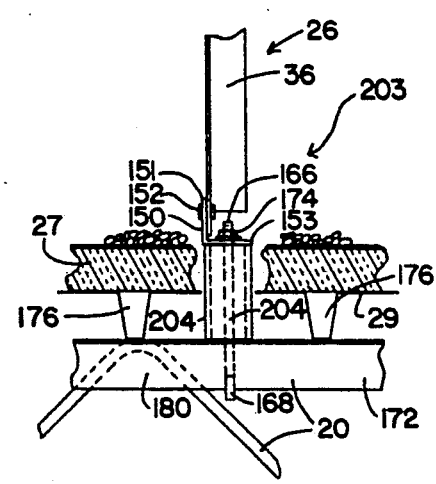
FIG. 22A and 22B and side views of the adjustable support spacer lower member received on top of a spacer mounted on top of an existing joist. The member secured to the joist using a J-bolt.
Figure 22B:
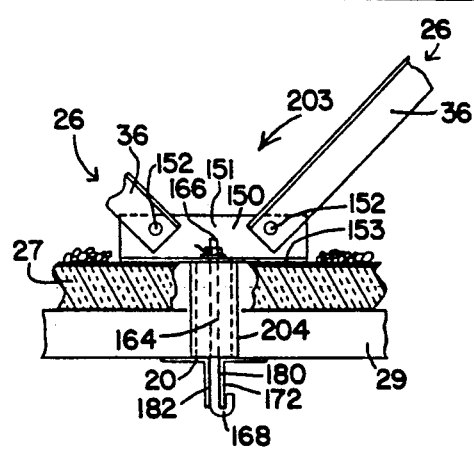

FIGS. 22A and 22B illustrate an end and side view, respectively, of still another apparatus 203 for securing the adjustable roofing support spacer 26 to the joist 20 wherein the lower member 150 is secured to the joist 20 using a spacer 204 having a bore extending therethrough. The spacer 204 is larger than the spacer 202 shown in FIGS. 21A and 21B. A hole is cut in the built-up roof 27 and through the existing deck 29 so that the bottom of the spacer 204 rests on top of the sides 180 and 182 of the joist 20. The spacer 204 is dimensioned so that its length extends from the top of the joist 20 to the top of the insulation and the built-up surface making up the built-up roof 27 of the existing deck 29. The J-bolt 164 is positioned through the bore in the spacer 204 and secured to the lip 172 of the joist 20 with the upper threaded end 166 secured to the lower member 150 using the nut 174. The horizontal flange 153 of the lower member 150 transmits the load from the webs 36 directly onto the top of the spacer 204 along with engaging the sides of the built-up roof 27 surrounding the hole cut therein.

Figure 23A:
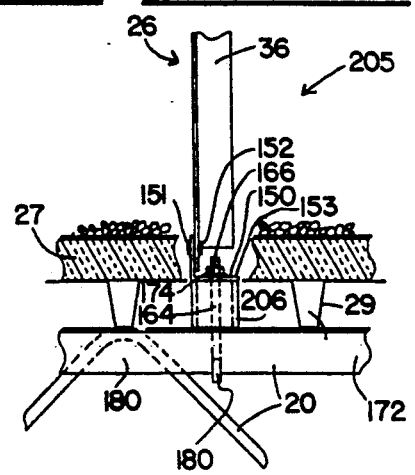
FIGS. 23A and 23B are end and side views of the adjustable support spacer lower member mounted on top of the existing roof deck and secured to an existing joist using a spacer and a J-bolt.
Figure 23B:
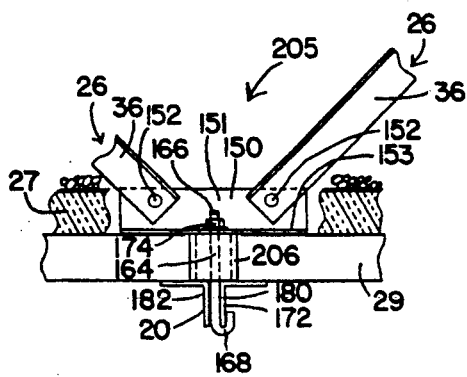

FIGS. 23A and 23B illustrate an end view and side view, respectively, of another apparatus 205 for securing the adjustable roofing support spacer 26 to the joist 20 wherein the lower member 150 is secured to the joist 20 using a spacer 206. The spacer 206 is shorter in length when compared to the spacer 204 shown in FIGS. 22A and 22B. A hole is cut again in the built-up roof 27 and the top of the existing deck 29 so that the bottom of the spacer 206 spans the space 170 between the sides 180 and 182 of the joist 20 and rests on top of the sides 180 and 182. In this embodiment the hole in the built-up roof 27 is enlarged so as to receive the lower member 150 therein and permit the lower member 150 to rest on top of existing deck 29. When employing the apparatus 205, the flange 153 of the lower member 150 transmits the load from the webs 36 directly onto the top of the spacer 206 along with engaging the sides of existing deck 29 surrounding the hole cut therein. The spacer 206 is dimensioned so its length extends from the top of the joist 20 to the top of the existing deck 29. The J-bolt 164 is received through a bore extending through the spacer 206; and the J-bolt 164 is secured to the lip 172 of the joist 20 with the upper threaded end 166 secured to the horizontal flange 153 of the lower member 150 using the nut 174.

It is clear that the present invention is well adapted to carry out the objects and attain the ends and advantages mentioned as well as those inherent therein. While a presently preferred embodiments of the invention has been described for purposes of this disclosure, numerous changes may be made which will readily suggest themselves to those skilled in the art and which are encompassed within the spirit of the invention disclosed and as defined in the appended claims.

What is claimed is:

1. In a roof assembly for a building wherein the building is provided with a new roof top surface spatially disposed and supported by roof support spacers above an existing corrugated roof and deck attached to supporting joints, the improvement comprising:

spacer means for supporting the roof support spacers thereon, the spacer means connectable to a joist supporting the existing deck, the existing roof is provided with a hole alignable with the joist, the spacer means comprising:

a spacer member having a hole therethrough, the spacer member dimensioned for receipt in one of the corrugations of the corrugated roof; and a support channel having a base and a pair of downwardly extending channel legs, the channel legs received through the hole in the existing roof and supported above the underlying joists; and connector means for interconnecting the spacer means and the joist, the connector means comprising:

a J-bolt having a threaded upper end an a lower J-end, the threaded upper end positionable through the hole in the spacer member such that the J-end engages one side of the joist; and tinner-man nut means positionable about the upper end of the J-bolt for engaging the joist and stabilizing the J-end on the joist.

2. In the roof assembly of claim 1 the improvement further comprising:

membrane means positionable between the hole in the existing roof and the downwardly extending channel legs of the spacer means for preventing movement of air and vapor through the hole.

* * * * *

UNITED STATES PATENT AND TRADEMARK OFFICE
CERTIFICATE OF CORRECTION

PATENT NO. : 5,005,323
DATED : April 9, 1991
INVENTOR(S) : Harold G. Simpson and Charanjit S. Bindra It is certified that error appears in the above-identified patent and that said Letters Patent is hereby corrected as shown below:

Column 1, line 19, after "Oct. 20, 1987" delete "following 1983";

Column 3, line 15, after "elevational" and before "of" insert --view--;

Column 6, line 41, delete "withat" and substitute therefor --with at--;

Column 8, line 45, delete "sup port" and substitute therefor --support--;

Column 9, line 2, delete "as";

Column 11, line 53, delete "side," and substitute therefor --side--;

Column 11, line 53, delete "28C," and substitute therefor --28C--;

Column 16, line 42, delete "member" and substitute therefor --members--;

Column 16, line 44, delete "20, (FIG." and substitute therefor --20 (FIG.--;

Column 16, line 45, delete "1A)" and substitute therefor --1A),--;

Column 18, line 18, delete "i78" and substitute therefor --178--;

UNITED STATES PATENT AND TRADEMARK OFFICE
CERTIFICATE OF CORRECTION

PATENT NO. : 5,005,323
DATED : April 9, 1991
INVENTOR(S) : Harold G. Simpson and Charanjit S. Bindra It is certified that error appears in the above-identified patent and that said Letters Patent is hereby corrected as shown below:

Column 18, line 8, after "17C," and before "such" insert --but--;

Column 18, line 41, after "roof" and before "154" insert --27 on the existing deck 29.-- While neither the hole 162 or the support channel--;

Column 18, line 42, delete "while neither the hole 162 or the support";

Column 18, line 43, delete "channel" and insert therefor --a hole is drilled through the built-up--;

Column 18, line 43, after "deck 29" and before "large" delete "which is";

Column 18, line 55, delete "plate" and substitute therefor --plate,--;

Column 18, line 60, delete "178"" and substitute therefor --½"-- therefor; and

UNITED STATES PATENT AND TRADEMARK OFFICE
CERTIFICATE OF CORRECTION

PATENT NO.   : 5,005,323

DATED        : April 9, 1991

INVENTOR(S)  : Harold G. Simpson and Charanjit S. Bindra

It is certified that error appears in the above-identified patent and that said Letters Patent is hereby corrected as shown below:

Column 20, line 29, after "porting" and before "the" delete "joints," and substitute therefor --joists,--.

Signed and Sealed this

Sixth Day of October, 1992

Attest:

DOUGLAS B. COMER

*Attesting Officer*   *Acting Commissioner of Patents and Trademarks*